(12) United States Patent
Shirai

(10) Patent No.: US 8,570,214 B2
(45) Date of Patent: Oct. 29, 2013

(54) POSITION CALCULATING METHOD AND POSITION CALCULATING DEVICE

(75) Inventor: Tsubasa Shirai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 230 days.

(21) Appl. No.: 13/115,929

(22) Filed: May 25, 2011

(65) Prior Publication Data

US 2011/0291881 A1    Dec. 1, 2011

(30) Foreign Application Priority Data

May 27, 2010    (JP) ................. 2010-121531

(51) Int. Cl.
*G01S 19/42* (2010.01)
(52) U.S. Cl.
USPC .................................. 342/357.25
(58) Field of Classification Search
USPC .................................. 342/357.25
See application file for complete search history.

(56) References Cited

U.S. PATENT DOCUMENTS

| | | | |
|---|---|---|---|
| 2004/0135721 A1* | 7/2004 | Hoven et al. | 342/357.02 |
| 2008/0309553 A1* | 12/2008 | Chansarkar et al. | 342/357.15 |
| 2009/0099773 A1 | 4/2009 | Watanabe | |
| 2010/0188284 A1* | 7/2010 | Anand et al. | 342/357.02 |
| 2011/0243192 A1* | 10/2011 | Tsakonas et al. | 375/136 |
| 2012/0094650 A1* | 4/2012 | Lei et al. | 455/422.1 |

FOREIGN PATENT DOCUMENTS

JP    2009/097897 A    5/2009

* cited by examiner

*Primary Examiner* — Harry Liu
(74) *Attorney, Agent, or Firm* — Kilpatrick Townsend & Stockton LLP

(57) ABSTRACT

There is provided a position calculating method including: calculating a pseudorange by receiving a satellite signal from a positioning satellite; and calculating a position using a normal mixture distribution model which expresses distribution of an error included in the pseudorange with normal mixture distribution.

6 Claims, 18 Drawing Sheets

POSITION CALCULATING METHOD AND POSITION CALCULATING DEVICE

BACKGROUND

1. Technical Field

The present invention relates to a position calculating method and a position calculating device.

2. Related Art

A GPS (Global Positioning System) is widely known as a positioning system using a positioning signal, and is used for a position calculating device built into a mobile phone, a car navigation apparatus, or the like. The GPS performs a position calculation operation for calculating a timepiece error and the position coordinates of a position calculating device on the basis of information, such as the positions of a plurality of GPS satellites or a pseudorange from each GPS satellite to the position calculating device.

As the position calculation operation using a satellite positioning system, a position calculation operation using a so-called least square method of minimizing the sum of the squares of the errors (hereinafter, referred to as "an error of the pseudorange"), which may be included in the pseudorange, using the pseudoranges calculated for a plurality of satellites is known (for example, refer to JP-A-2009-97897).

In general, the position calculation operation using the least square method is an effective technique when approximately calculating a timepiece error and the position coordinates of a position calculating device when the number of positioning satellites, which have been successfully captured, is larger than the number of unknowns (in an overdetermined state). However, the position calculated using the least square method is not necessarily reliable.

If an error of the pseudorange can definitely be regarded as white noise at all times, the position calculated using the least square method may be reliable. Mathematically speaking, this is a case where the distribution of error of the pseudorange follows normal distribution (Gaussian distribution). However, this is just an ideal case.

In a satellite positioning system, various errors may be included in the measured pseudorange due to various error factors. A typical example thereof is a multi-path. In a so-called multi-path environment, a satellite signal reaches a position calculating device through two or more paths. A signal that the position calculating device receives is a signal (multi-path signal) in which indirect wave signals, such as a reflected wave reflected from buildings or the ground, a transmitted wave transmitted through an obstacle, and a diffracted wave diffracted by an obstacle, are superimposed on a direct wave signal which is a satellite signal transmitted from a positioning satellite. The indirect wave signal reaches the position calculating device with a path length which is larger than that of the direct wave signal. Due to the influence of the indirect wave signal, an undetermined error which does not follow the normal distribution may be included in the pseudorange measured by the position calculating device.

SUMMARY

An advantage of some aspects of the invention is to propose a new position calculating method.

A first aspect of the invention is directed to a position calculating method including: calculating a pseudorange by receiving a satellite signal from a positioning satellite; and calculating a position using a normal mixture distribution model which expresses distribution of an error included in the pseudorange with normal mixture distribution.

As another aspect of the invention, there may be configured a position calculating device including: a pseudorange calculating section which calculates a pseudorange by receiving a satellite signal from a positioning satellite; and a position calculating section which calculates a position using a normal mixture distribution model which expresses distribution of an error included in the pseudorange with normal mixture distribution.

According to these aspects of the invention, a pseudorange is calculated by receiving a satellite signal from a positioning satellite. In addition, the position is calculated using a normal mixture distribution model which expresses the distribution of an error included in the pseudorange with the normal mixture distribution. By this new method, it is possible to improve the accuracy of position calculation in a situation where the distribution of an error included in the pseudorange follows the normal mixture distribution.

As a second aspect of the invention, the position calculating method according to the first aspect of the invention may be configured such that the normal mixture distribution model is defined as a probability density function having the error as a variable.

As a third aspect of the invention, the position calculating method according to the second aspect of the invention may be configured such that the calculating of the position repeats calculating an error included in the pseudorange using an assumed position of the position, calculating a probability corresponding to the error using the normal mixture distribution model, and updating the assumed position using the probability.

According to the third aspect of the invention, an error included in the pseudorange is calculated using the assumed position and a probability corresponding to the error is calculated using the normal mixture distribution model. In addition, the assumed position is updated using the probability. The series of processings is repeatedly performed to calculate the position. A position near the true position can be acquired by calculating the probability corresponding to the error included in the pseudorange using the normal mixture distribution model and updating the assumed position using the probability.

In addition, as a fourth aspect of the invention, the position calculating method may be configured such that the normal mixture distribution model is a model obtained by mixing at least a first normal distribution model and a second normal distribution model with a smaller peak value than that of the first normal distribution model.

According to the fourth aspect of the invention, since the normal mixture distribution model becomes a model when a situation is assumed in which an error is mixed in a pseudorange at different rates, the accuracy of position calculation in the situation can be improved.

In addition, as a fifth aspect of the invention, the position calculating method may be configured such that the normal mixture distribution model is a model obtained by mixing at least a first normal distribution model and a second normal distribution model with a larger standard deviation than that of the first normal distribution model.

According to the fifth aspect of the invention, since the normal mixture distribution model becomes a model when a situation is assumed in which an error in a wider error range is mixed in a pseudorange, the accuracy of position calculation in the situation can be improved.

In addition, as a sixth aspect of the invention, the position calculating method may be configured such that the normal mixture distribution model is a model obtained by mixing at least a first normal distribution model and a second normal distribution model with a larger expected value of an error than that of the first normal distribution model.

According to the sixth aspect of the invention, since the normal mixture distribution model becomes a model when a situation is assumed in which a larger error is mixed in a pseudorange, the accuracy of position calculation in the situation can be improved.

In addition, as a seventh aspect of the invention, the position calculating method may be configured such that the normal mixture distribution model is a model obtained by mixing at least a first normal distribution model, which indicates distribution of an error included in the pseudorange when a direct wave of the satellite signal is received, and a second normal distribution model, which indicates distribution of an error included in the pseudorange when an indirect wave of the satellite signal is received.

In this case, since the normal mixture distribution model becomes a model when a so-called multi-path environment is assumed, the accuracy of position calculation in the multi-path environment can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments to which the invention is applied will be described with reference to the accompanying drawings. In addition, it is needless to say that embodiments, to which the invention can be applied, are not limited to embodiments which will be described below.

1. Principles

The principle of position calculation in the related art will be described first, and then the principle of position calculation in the present embodiment will be described. The present embodiment is an embodiment in which position calculation is performed using a GPS (Global Positioning System) which is a type of satellite positioning system.

Figure 1:
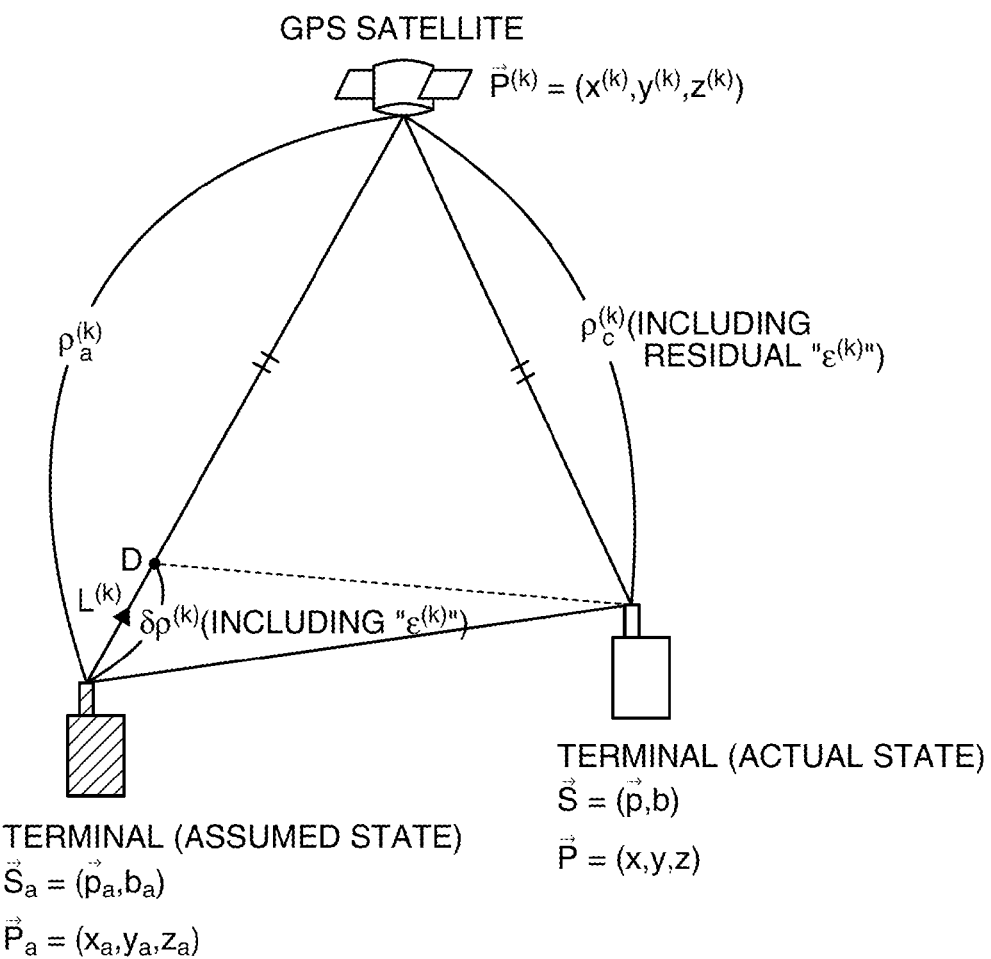
FIG. 1 is an explanatory view of the principle of position calculation.

FIG. 1 is an explanatory view of the principle of position calculation. A variable is defined first. The number of a GPS satellite which is a type of positioning satellite is expressed as a value of a variable "k" (k=1, 2, . . . ). Moreover, in the following expressions, the number of the GPS satellite is expressed as a superscript, and the superscript is expressed in parentheses so as to be distinguished from the exponent.

A position vector of the k-th GPS satellite is expressed as $P^{(k)}=(x^{(k)}, y^{(k)}, z^{(k)})$ which is a vector notation. The position vector of a GPS satellite is calculated using the time information or the satellite orbit information, such as an ephemeris or an almanac.

In addition, the position coordinates indicating the actual position of a position calculating device are expressed as "p=(x, y, z)" which is a vector notation. The actual position "p" is an unknown and is also a value to be eventually calculated. In addition, the position coordinates indicating the assumed position, which is an assumed position of a position calculating device (user), is expressed as "$p_a=(x_a, y_a, z_a)$" which is a vector notation. The assumed position "$p_a$" is a value which is updated by iteration when necessary in position calculation processing.

In addition, the position coordinates of a GPS satellite and the position coordinates of a position calculating device mean the position coordinates in the arbitrary coordinate system. For example, the position coordinates of a GPS satellite and the position coordinates of a position calculating device may be defined as the position coordinates in the terrestrial reference system which is a kind of three-dimensional Cartesian coordinate system.

An actual clock bias, which is an actual bias of an internal clock mounted in a position calculating device is expressed as "b". The actual clock bias "b" is an unknown and is also a value to be eventually calculated. In addition, an assumed clock bias, which is an assumed bias of an internal clock of a position calculating device, is expressed as "$b_a$". The assumed clock bias "$b_a$" is a value which is updated by iteration when necessary in position calculation processing.

In addition, in the present embodiment, a four-dimensional vector indicating the position of a position calculating device and a clock bias is defined as a state "S" of the position calculating device for the sake of convenience. That is, "S=(p, b)" is defined. In addition, a four-dimensional vector indicating the assumed position of a position calculating device and an assumed clock bias is defined as an assumed state "$S_a$" of the position calculating device. That is, "$S_a=(p_a, b_a)$" is defined.

Next, a pseudorange between a position calculating device and a GPS satellite is expressed as "$\rho_c$". In addition, the geometric distance between a position calculating device and a GPS satellite, which is calculated using the assumed position "$P_a$" of the position calculating device and the satellite position "$P^{(k)}$" of the GPS satellite, is expressed as "$\rho_a$".

The pseudorange "$\rho_c$" can be calculated using a code phase that the position calculating device acquires as measurement information using a GPS satellite signal. The code phase is a phase of a spread code of a GPS satellite signal received by the position calculating device. The GPS satellite signal is a communication signal with a frequency of 1.57542 [GHz] that is modulated by the CDMA (Code Division Multiple Access) method, which is known as a spread spectrum method, using a CA (Coarse/Acquisition) code which is a type of spread code. The CA code is a pseudo random noise code, which has a code length of 1023 chips as 1 PN frame and has a repetition period of 1 ms, and differs with each GPS satellite.

Ideally, it may be considered that a plurality of CA codes is aligned between a GPS satellite and a position calculating device. Since the distance between a GPS satellite and a position calculating device may not exactly be integral multiples of the CA code, a fractional part may occur. The phase of a CA code of a GPS satellite signal is equivalent to the fractional part of the pseudorange. In addition, the integral part of the pseudorange can be calculated using the initial position of the position calculating device and the satellite position calculated from the satellite orbit information.

In addition, the pseudorange "$\rho_c$" and the geometric distance "$\rho_a$" can be formulized like the following Expressions (1) and (2).

$$\rho_c^{(k)} = \|\vec{p}^{(k)} - \vec{p}_a - \delta\vec{p}\| + b + \epsilon^{(k)} \tag{1}$$

$$\rho_a^{(k)} = \|\vec{p}^{(k)} - \vec{p}_a\| + b_a \tag{2}$$

In Expression (1), "$\epsilon$" indicates a residual included in a pseudorange. In the satellite positioning system using a GPS, there are various error factors. For this reason, various errors are included in a pseudorange measured by the position calculating device. For example, there are an error of a satellite clock, an error of satellite orbit information, ionosphere delay, troposphere delay, and noise of a GPS signal receiver.

Generally, the position calculating device corrects an error component which can be corrected, among error components included in the pseudorange, using the navigation message data transmitted from a GPS satellite, the assistant data supplied from a well-known assistant server, and the like and then uses it for a position calculation operation. However, there is an error component which cannot be corrected just with the existing data (information). This error component becomes a residual included in a pseudorange.

On the other hand, the actual position "P" of the position calculating device can be expressed as the following Expression (3) using the assumed position "$P_a$". In addition, the actual clock bias "b" of the position calculating device can be expressed as the following Expression (4) using the assumed clock bias "$b_a$".

$$\vec{p} = \vec{p}_a + \delta\vec{p} \tag{3}$$

$$b = b_a + \delta b \tag{4}$$

Here, "$\delta p$" and "$\delta b$" are unknown amounts of correction for the assumed position and the assumed clock bias, respectively.

In this case, the following Expression (5) can be formulized using the pseudorange "$\rho_c$" and the geometric distance "$\rho_a$" expressed as Expressions (1) and (2).

$$\begin{aligned}\delta\rho^{(k)} &= \rho_c^{(k)} - \rho_a^{(k)} \\ &= \|\vec{p}^{(k)} - \vec{p}_a - \delta\vec{p}\| - \|\vec{p}^{(k)} - \vec{p}_a\| + (b - b_a) + \epsilon^{(k)} \\ &\approx -\frac{\vec{p}^{(k)} - \vec{p}_a}{\|\vec{p}^{(k)} - \vec{p}_a\|} \cdot \delta\vec{p} + \delta b + \epsilon^{(k)} \\ &= -\vec{L}^{(k)} \cdot \delta\vec{p} + \delta b + \epsilon^{(k)}\end{aligned} \tag{5}$$

In Expression (5), Taylor-series approximation for the norm of a vector is used for approximation of the second and third rows. In addition, "L" of the vector is a unit vector in the eye direction of a GPS satellite seen from the assumed position "$P_a$" of the position calculating device.

Here, it is assumed that the position calculating device has succeeded in capturing K GPS satellites (GPS satellite signals). In this case, simultaneous equations such as the following Equation (6) can be established using Expression (5).

$$\delta\vec{\rho} = G\delta\vec{S} + \vec{\epsilon} = G\begin{bmatrix}\delta\vec{p} \\ \delta b\end{bmatrix} + \vec{\epsilon} \tag{6}$$

However, "$\delta S$" is the amount of state correction indicating the unknown amount of correction of the state "S=(p, b)".

The vector "$\delta p$" on the left side of Expression (6) is a correction amount vector of a pseudorange, and is expressed as the following expression (7).

$$\delta\vec{\rho} = \begin{bmatrix}\delta\rho^{(1)} \\ \delta\rho^{(2)} \\ \vdots \\ \delta\rho^{(K)}\end{bmatrix} \tag{7}$$

In addition, the matrix "G" on the right side of Expression (6) is a geometric matrix of (K×4) which determines the satellite arrangement of GPS satellites observed from the position calculating device, and is expressed as the following Expression (8).

$$G = \begin{bmatrix}(-L^{(1)}) & 1 \\ (-L^{(2)}) & 1 \\ \vdots & \vdots \\ (-L^{(K)}) & 1\end{bmatrix} \tag{8}$$

The vector "$\epsilon$" on the right side of Expression (6) is a pseudorange residual vector and is expressed as the following expression (9).

$$\vec{\varepsilon} = \begin{bmatrix} \varepsilon^{(1)} \\ \varepsilon^{(2)} \\ \vdots \\ \varepsilon^{(K)} \end{bmatrix} \quad (9)$$

In Expression (6), there are a total of four unknowns including the amount of position correction "δp=(δx, δy, δz)" and the amount of clock bias correction "δb", which are components of the amount of state correction "δS". Therefore, Expression (6) can be solved when K≥4. In the case of K>4, Expression (6) becomes an overdetermined equation. In this case, the amount of state correction "δS" can be approximately calculated like the following Expression (10) using a least square method, for example.

$$\vec{\delta S} = \begin{bmatrix} \vec{\delta p} \\ \delta b \end{bmatrix} = (G^T G)^{-1} G^T \vec{\delta \rho} \quad (10)$$

If the amount of state correction "δs" is approximately calculated using Expression (10), the position of the position calculating device and the clock bias can be calculated according to Expressions (3) and (4) using the amount of position correction "δp=(δx, δy, δz)" and the amount of clock bias correction "δb".

Here, the problem is whether the position and the clock bias calculated by the method described above are always reliable. Depending on the reception environment of a GPS satellite signal, the position and the clock bias are not always reliable. This is because even though the least square method is used to derive Expressions (9) and (10), the calculation operation is performed assuming that the distribution of the pseudorange residual "ε" follows normal distribution (Gaussian distribution) in the least square method.

Figure 2:
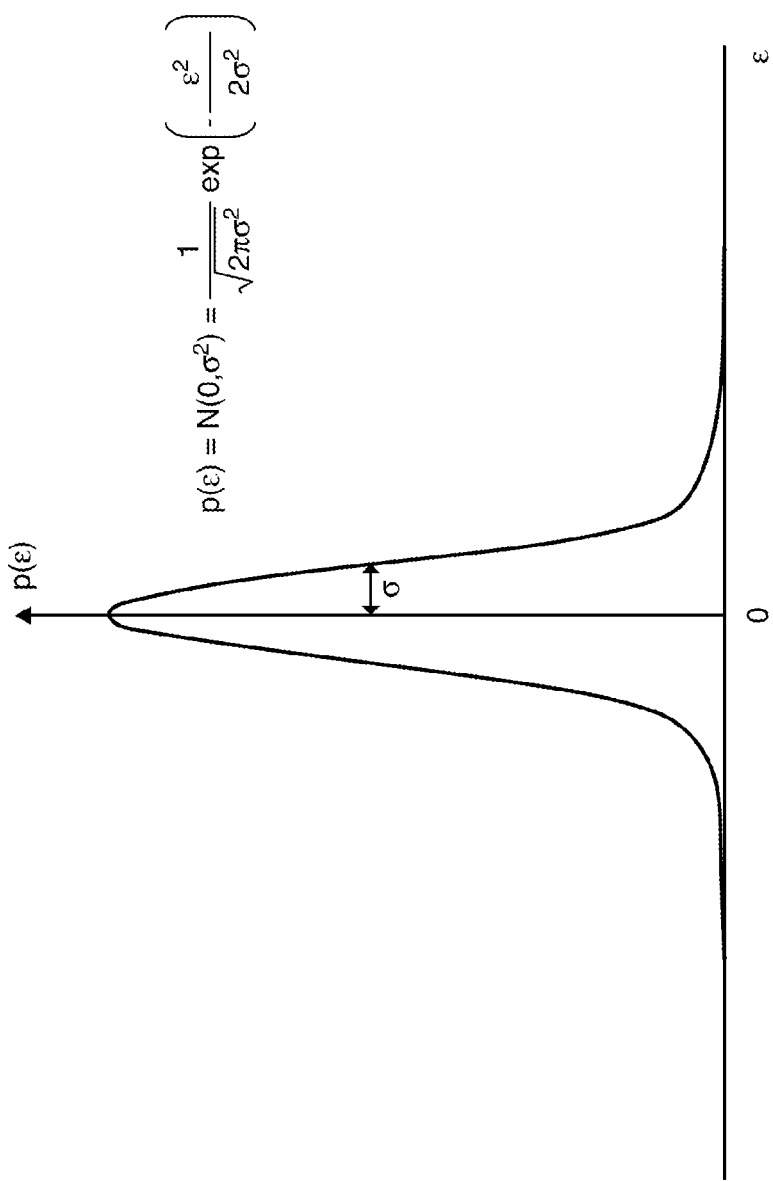
FIG. 2 is an explanatory view of a normal distribution model of a pseudorange residual.

FIG. 2 is an explanatory view of a normal distribution model of the pseudorange residual "ε". FIG. 2 shows a probability density function based on the normal distribution in which the horizontal axis indicates the pseudorange residual "ε", which is a random variable, and the vertical axis indicates the probability density "P(ε)". The size of the pseudorange residual "ε" changes, when necessary, according to the change of an error component included in the pseudorange. By assuming that the distribution of the pseudorange residual "ε" in that case follows the normal distribution N(0, σ²) in which the expected value (average value) "μ" is set to "0" (μ=0) and the standard deviation (error range) is set to "σ" (variance "σ²"), the least square method is performed.

However, the distribution of the pseudorange residual "ε" does not necessarily follow the normal distribution. This is because the pseudorange residual "ε" is not necessarily distributed near "0" depending on the reception environment of a GPS satellite signal or the like. A typical example in which such a situation is assumed is a "multi-path environment".

Figure 3:
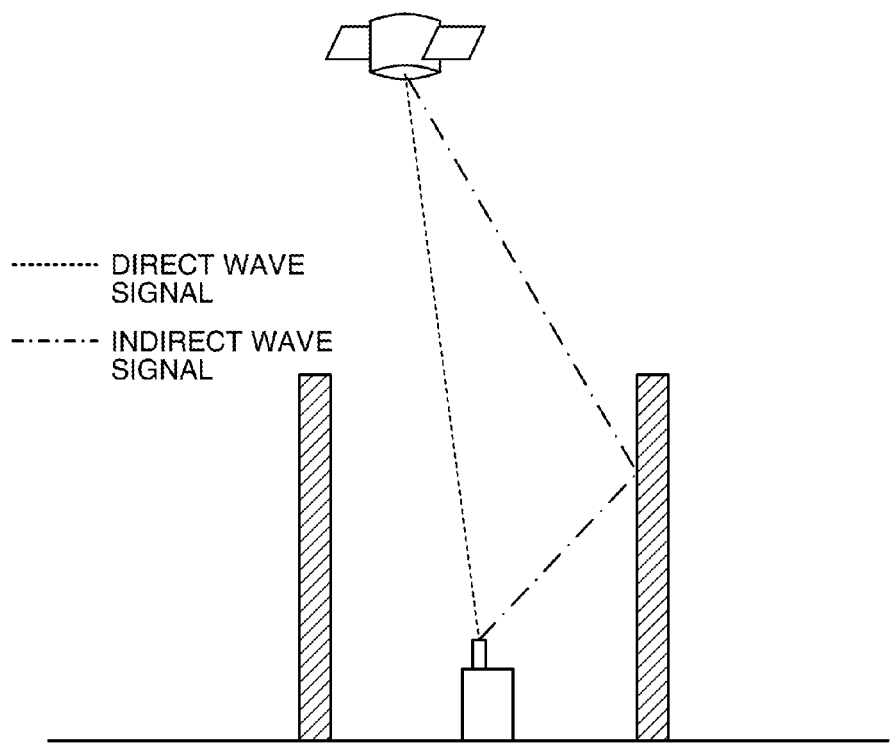
FIG. 3 is an explanatory view of the multi-path environment.

FIG. 3 is an explanatory view of a multi-path environment. In the multi-path environment, a GPS satellite signal transmitted from a GPS satellite reaches a position calculating device through two or more paths. Specifically, a signal that the position calculating device receives is a signal (multi-path signal) in which indirect wave signals, such as a reflected wave reflected from buildings or the ground, a transmitted wave transmitted through an obstacle, and a diffracted wave diffracted by an obstacle, are superimposed on a direct wave signal which is a GPS satellite signal transmitted from a GPS satellite. In FIG. 3, a dotted line indicates a direct wave signal and a one-dot chain line indicates an indirect wave signal.

Due to an indirect wave signal, an error occurs in a pseudorange measured by the position calculating device. The pseudorange is calculated using a code phase that the position calculating device acquires as measurement information, and a large error may be included in this code phase in the multi-path environment. The error of the code phase may be a positive error or a negative error with respect to a true code phase.

Figure 4:
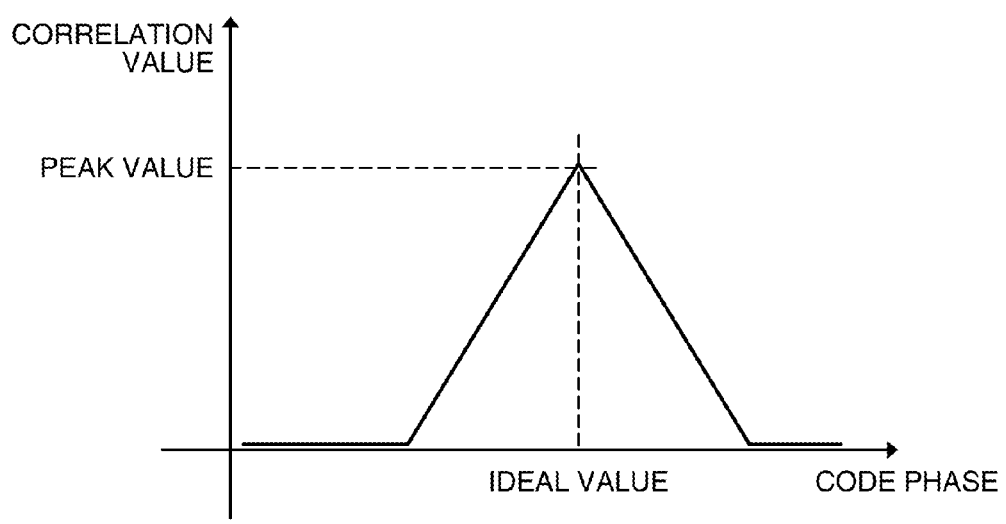
FIG. 4 is an explanatory view of the principle of code phase detection.

FIG. 4 is an explanatory view of the principle of code phase detection. FIG. 4 shows a schematic example of the autocorrelation value of a C/A code when the horizontal axis indicates a phase (code phase) of the CA code and the vertical axis indicates a correlation value. Moreover, in the following explanation, the correlation value means the size (absolute value) of the correlation value.

The autocorrelation value of the C/A code is expressed in the approximately triangular shape which is symmetrical and has a peak value as an apex, for example. In this case, the phase corresponding to the peak value (hereinafter, referred to as a "correlation peak value") of the correlation value is a phase of a CA code of a received GPS satellite signal. The position calculating device detects a code phase as follows. A correlation value in each of a code phase, which leads a certain code phase by a predetermined amount (hereinafter, referred to as a "leading phase") and a code phase, which lags behind the certain code phase by a predetermined amount (hereinafter, referred to as a "lag phase") is calculated. Then, when the correlation value of the leading phase becomes equal to the correlation value of the lag phase, a code phase at the center is detected as a peak phase.

In FIG. 4, since the correlation value is expressed in the approximately triangular shape which is symmetrical, the code phase at the center of the correlation value of the leading phase and the correlation value of the lag phase becomes a code phase exactly corresponding to the peak value (hereinafter, referred to as a "peak phase"). Accordingly, this code phase is detected as a peak phase (hereinafter, referred to as a "detected peak phase"). Although the shape of the correlation value shown in FIG. 4 is an ideal shape, the shape of the correlation value changes in the multi-path environment.

Figure 5:
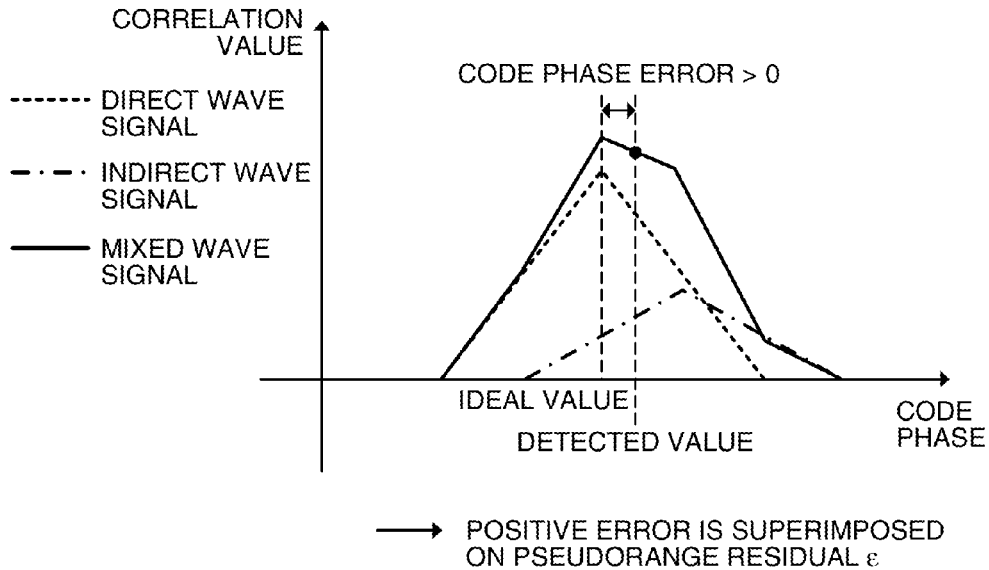
FIG. 5 is a view showing an example of autocorrelation in the multi-path environment.
Figure 6:
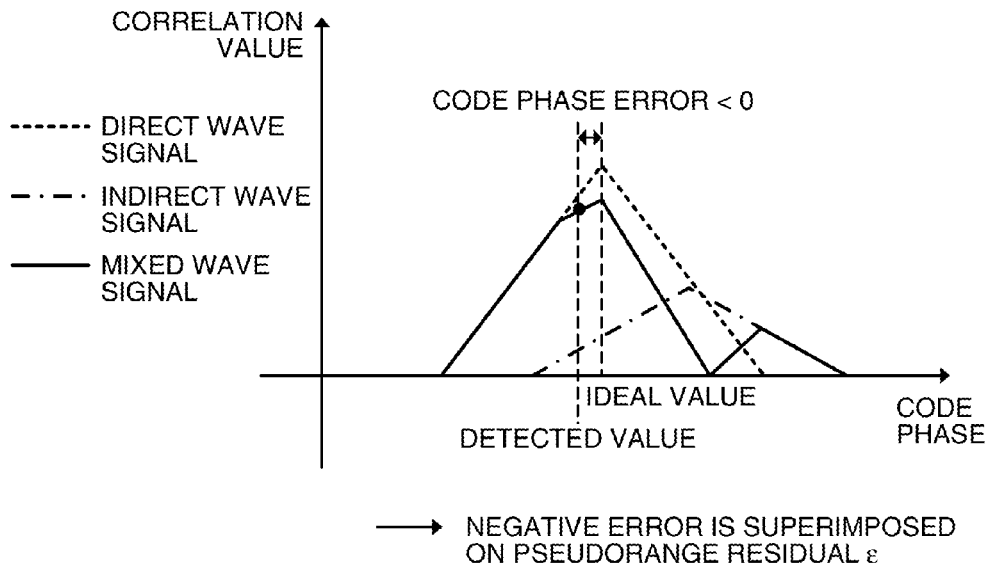
FIG. 6 is a view showing an example of autocorrelation in the multi-path environment.

FIGS. 5 and 6 are views showing examples of the shape of the correlation value in the multi-path environment. FIG. 5 is a view showing an example of a correlation result when an indirect wave signal reaches the same phase as a direct wave signal (0≤θ≤π), and FIG. 6 is a view showing an example of a correlation result when an indirect wave signal reaches the opposite phase to a direct wave signal (π≤θ≤2π). However, "θ" is the phase of an indirect wave signal. FIGS. 5 and 6 show graphs of the correlation values corresponding to a direct wave signal, an indirect wave signal, and a multi-path signal obtained by mixing the direct wave signal with the indirect wave signal. The horizontal axis indicates a code phase, and the vertical axis indicates a correlation value.

The correlation value for the indirect wave signal is expressed in the approximately triangular shape similar to the correlation value for the direct wave signal, but the correlation peak value of the indirect wave signal is lower than the correlation peak value of the direct wave signal. This is because a GPS satellite signal transmitted from a GPS satellite is reflected from buildings or the ground or transmitted through an obstacle and accordingly, the signal strength at the time of signal transmission becomes weak at the time of signal reception.

In addition, the peak phase of the indirect wave signal lags behind the peak phase of the direct wave signal. This is because a GPS satellite signal transmitted from a GPS satellite is reflected from buildings or the ground or diffracted by an obstacle and accordingly, the propagation distance from the GPS satellite to the position calculating device has become long. Since the correlation value for the multi-path signal is a sum of the correlation value of the direct wave signal and the correlation value of the indirect wave signal, the triangular shape is distorted. Accordingly, a symmetrical shape with respect to the peak value is not obtained.

When the indirect wave signal and direct wave signal reach the position calculating device in the same phase, the direct wave signal and the indirect wave signal reinforce each other. For this reason, the correlation value of the mixed wave signal becomes a sum of the correlation value for the direct wave signal and the correlation value for the indirect wave signal. In this case, the shape of the correlation value becomes a shape shown in FIG. 5. In FIG. 5, the detected peak phase is larger than the peak phase which is a code phase corresponding to the actual peak value.

On the other hand, when the indirect wave signal reaches a state lagging behind the direct wave signal by a half period or more and the indirect wave signal has an opposite phase to the direct wave signal, the direct wave signal and the indirect wave signal weaken each other. For this reason, the correlation value of the mixed wave signal becomes a value obtained by subtracting the correlation value for the direct wave signal from the correlation value for the indirect wave signal. In this case, the shape of the correlation value becomes a shape shown in FIG. 6. In FIG. 6, the detected peak phase is smaller than the peak phase which is a code phase corresponding to the actual peak value. Moreover, in FIG. 6, when the correlation value of the indirect wave signal is larger than the correlation value of the direct wave signal, the value after subtraction is a negative value. However, in FIG. 6, the value after subtraction is expressed as an absolute value.

For the sake of convenience, the phase difference between the detected peak phase and the actual peak phase is defined as a "code phase error". In addition, the reference numeral of a code phase error when the detected peak phase lags behind the actual peak phase is defined as "positive", and the reference numeral of a code phase error when the detected peak phase leads the actual peak phase is defined as "negative". In this case, the code phase error in FIG. 5 is "positive", and the code phase error in FIG. 6 is "negative".

As described above, since the pseudorange is calculated using a code phase, an error of the code phase is superimposed on the pseudorange as an error. That is, when a positive error is included in a code phase as shown in FIG. 5, the positive error is superimposed as the pseudorange residual "$\epsilon$". On the other hand, when a negative error is included in a code phase as shown in FIG. 6, the negative error is superimposed as the pseudorange residual "$\epsilon$".

Thus, in the multi-path environment, the pseudorange residual "$\epsilon$" may be a positive value or a negative value depending on the code phase error. Undoubtedly, error components other than the code phase error are also included in the pseudorange residual "$\epsilon$". For this reason, the pseudorange residual "$\epsilon$" may have various values according to the size of these error components.

Therefore, in the present embodiment, the assumed distribution of the pseudorange residual "$\epsilon$" is not assumed to be simple normal distribution but is assumed to be normal mixture distribution in which a plurality of normal distributions is mixed. Specifically, the pseudorange residual "$\epsilon$" is modeled using a model function based on the normal mixture distribution having the pseudorange residual "$\epsilon$" as a variable. In the following explanation, a normal mixture distribution model is appropriately expressed as a GMM (Gaussian Mixture Model). In addition, a normal mixture distribution model of the pseudorange residual "$\epsilon$" is called a "pseudorange residual GMM", and the model function is called a "pseudorange residual GMM function".

Figure 7:
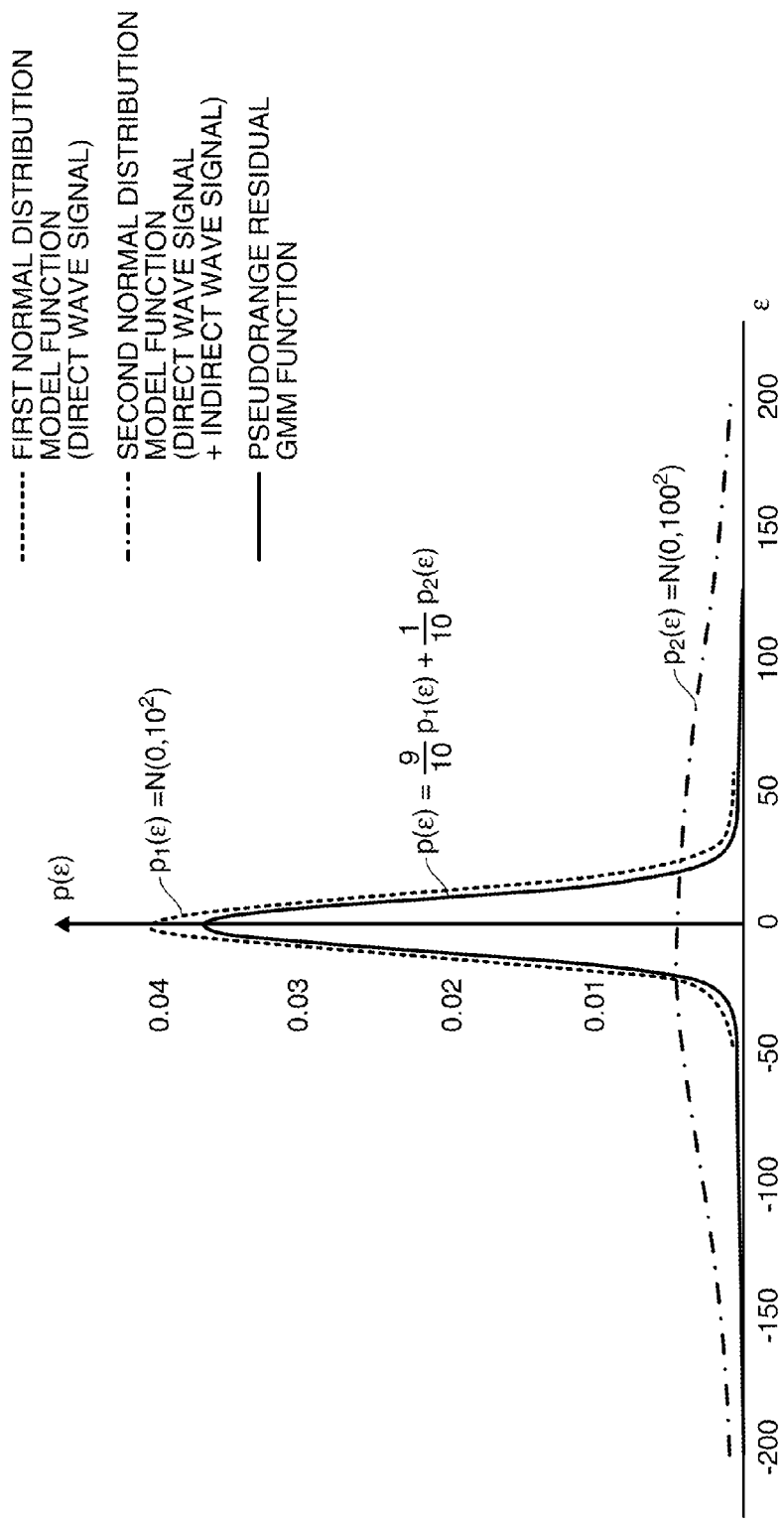
FIG. 7 is a view showing a pseudorange residual GMM function.

FIG. 7 is a view showing an example of the pseudorange residual GMM function in the present embodiment. The pseudorange residual GMM function of the present embodiment is defined as a function "$p(\epsilon)$" obtained by mixing two kinds of probability density functions according to the normal distribution, which are the first normal distribution model function "$P_1(\epsilon)$" and the second normal distribution model function "$P_2(\epsilon)$". In FIG. 7, the horizontal axis indicates the pseudorange residual "$\epsilon$" (unit is a meter) which is a random variable, and the vertical axis indicates a probability density "$p(\epsilon)$". In addition, the first normal distribution model function "$P_1(\epsilon)$" is indicated by a dotted line, the second normal distribution model function "$P_2(\epsilon)$" is indicated by a one-dot chain line, and the pseudorange residual GMM function "$p(\epsilon)$" is indicated by a thick solid line.

The first normal distribution model function "$P_1(\epsilon)$" is a model function of the pseudorange residual "$\epsilon$" when it is assumed that the position calculating device receives a direct wave signal. If there is no influence of an indirect wave signal, the pseudorange residual "$\epsilon$" is expected to become a value near "0 meter". For this reason, the first normal distribution model function "$P_1(\epsilon)$" is modeled using the normal distribution function $N(0, 10^2)$ in which the expected value "$\mu$" of the pseudorange residual is set to "0 meter" ($\mu=0$) and the standard deviation "$\sigma$" is set to "10 meters" ($\sigma=10$), which is a relatively small value.

The second normal distribution model function "$P_2(\epsilon)$" is a model function of the pseudorange residual "$\epsilon$" when it is assumed that the position calculating device receives a direct wave signal and an indirect wave signal. As described above, the pseudorange residual "$\epsilon$" may be either a positive value or a negative value according to the sign of a code phase error. For this reason, the expected value "$\mu$" of the pseudorange residual of the second normal distribution model function "$P_2(\epsilon)$" is set to "0 meter" ($\mu=0$) which is the center between positive and negative. In addition, a large error may be included in the pseudorange residual "$\epsilon$" depending on the size of a code phase error. For this reason, the standard deviation "$\sigma$" of the pseudorange residual is estimated at the large value and set to "100 meters" ($\sigma=100$). That is, the second normal distribution model function "$P_2(\epsilon)$" is set to the normal distribution function $N(0, 100^2)$.

Next, the ratio (mixture ratio) when mixing the first normal distribution model function "$P_1(\epsilon)$" and the second normal distribution model function "$P_2(\epsilon)$" is set up as follows. It is thought that the rate at which the position calculating device is influenced by multi-path is not so high. Therefore, assuming that the position calculating device is influenced by multi-path with a probability of ten percent, the weight of the first normal distribution model function "$P_1(\epsilon)$" is set to "9/10 (90 percent)" and the weight of the second normal distribution model function "$P_2(\epsilon)$" was set to "1/10 (10 percent)". Accordingly, the pseudorange residual GMM function is defined as a function obtained by mixing a function, which is obtained by multiplying the first normal distribution model function "$P_1(\epsilon)$" by 9/10, and a function, which is obtained by multiplying the second normal distribution model function "$P_2(\epsilon)$" by 1/10.

In addition, since the pseudorange residual GMM function is a probability density function, a result obtained by integrating the pseudorange residual GMM function for all pseudorange residuals is "1".

In the present embodiment, the position calculation operation is performed using an estimation method called a maximum likelihood estimation method using the above-described pseudorange residual GMM function. The maximum likelihood estimation method is a method of estimating a parameter, which probably has a highest probability in the assumed probability model, on the basis of the observed sample data.

Figure 8:
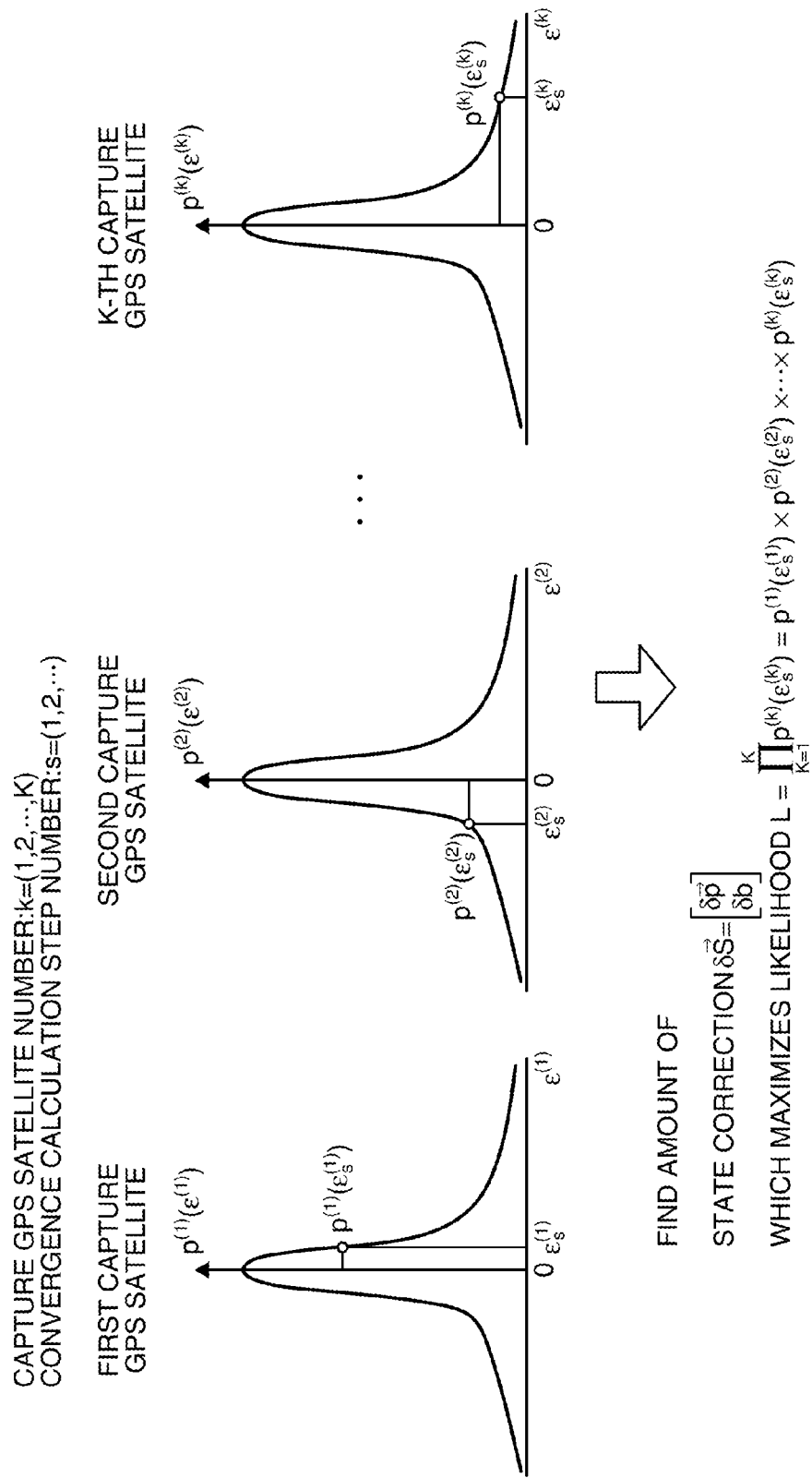
FIG. 8 is an explanatory view of a maximum likelihood estimation method.

FIG. 8 is an explanatory view of the position calculation operation using the maximum likelihood estimation method in the present embodiment. It is assumed that K GPS satellites of first to K-th satellites are captured. The position calculation operation is realized by calculating various values for position calculation operation, such as the geometric distance, the pseudorange, and the eye direction described in FIG. 1, for each of the K captured satellites and performs convergence calculation using these various values.

In the convergence calculation, an operation of updating the initial value when necessary is performed until the set initial value satisfies predetermined convergence conditions. In the present embodiment, convergence calculation is performed with the amount of state correction "$\delta S = (\delta p, \delta b) = (\delta x, \delta y, \delta z, \delta b)$", which is the amount of correction of the state "S" including the position of the position calculating device and the clock bias, as a parameter to be updated. That is, after setting the initial value of the amount of state correction "$\delta S$", the amount of state correction "$\delta S$" is updated such that a probability density (in a broad sense, a probability), in which pseudorange residuals "$\epsilon^{(1)}, \epsilon^{(2)}, \ldots, \epsilon^{(K)}$" calculated for the first to K-th satellites occur simultaneously, is maximized.

This will be specifically described in each step (s=1, 2, ...) of the convergence calculation, a probability density in which the pseudorange residuals "$\epsilon^{(1)}, \epsilon^{(2)}, \ldots, \epsilon^{(K)}$" occur simultaneously is set as a likelihood "L" and calculated according to the following Expression (11) for K captured satellites.

$$L = \prod_{k=1}^{K} p^{(k)}(\varepsilon^{(k)}) = p^{(1)}(\varepsilon^{(1)}) \times p^{(2)}(\varepsilon^{(2)}) \times \ldots \times p^{(K)}(\varepsilon^{(K)}) \quad (11)$$

In Expression (11), "$p^{(k)}(\epsilon)$" on the right side is a pseudorange residual GMM function regarding the k-th satellite, and "$\epsilon^{(k)}$" is a pseudorange residual calculated for the k-th satellite. In the present embodiment, the pseudorange residual GMM function "$p^{(k)}(\epsilon)$" is assumed to be a common function (pseudorange residual GMM function shown in FIG. 7) for all satellites.

A solution to be calculated is the amount of state correction "$\delta S$" which maximizes the likelihood "L". Accordingly, it is preferable to calculate the amount of state correction "$\delta S$" which makes the differential of the likelihood "L" become "0". However, since the likelihood "L" is expressed as a product of the K pseudorange residual GMM functions as can be seen from Expression (11), its differential calculation is difficult. Accordingly, calculation using a logarithmic likelihood "logL", which is the logarithm of the likelihood "L", is performed. The logarithmic likelihood "logL" is given by the following Expression (12).

$$\log L = \log \prod_{k=1}^{K} p^{(k)}(\varepsilon^{(k)}) \quad (12)$$

-continued
$$= \log[p^{(1)}(\varepsilon^{(1)}) \times p^{(2)}(\varepsilon^{(2)}) \times \ldots \times p^{(K)}(\varepsilon^{(K)})]$$
$$= \log(p^{(1)}(\varepsilon^{(1)})) + \log(p^{(2)}(\varepsilon^{(2)})) + \ldots + \log(p^{(K)}(\varepsilon^{(K)}))$$
$$= \prod_{k=1}^{K} \log(p^{(k)}(\varepsilon^{(k)}))$$
$$= \prod_{k=1}^{K} \log(\alpha_1 p_1^{(k)}(\varepsilon^{(k)}) + \alpha_2 p_2^{(k)}(\varepsilon^{(k)}))$$

Calculating the amount of state correction "$\delta S$" which maximizes the likelihood "L" is equivalent to calculating the amount of state correction "$\delta S$" which maximizes the logarithmic likelihood "logL" given by Expression (12). In order to realize this using a computer, an EM (Expectation Maximum) algorithm which is a type of algorithm for solving the optimization problem is used in the present embodiment.

The EM algorithm is a type of method of estimating a parameter of a probability model on the basis of the maximum likelihood estimation method. This method is used when not only observable data (sample) but also non-observable data (hidden parameter) is present and the hidden parameter depends on the probability model.

The EM algorithm is a type of repetition method and repeats two steps, which are an E (Expectation) step that is an expected value step and an M (Maximum) step that is a maximization step, according to a function called a Q function in order to search for the maximum likelihood estimate.

A parameter to be estimated is assumed to be the amount of state correction "$\delta S$". In addition, the observable data (sample) is assumed to be data of the pseudorange residual "$\epsilon$" which is repeatedly calculated in the convergence calculation. In addition, the hidden parameter (potential variable) "t" and the Q function "Q" are defined as expressed by the following Expressions (13) and (14), for example.

$$t_i = \begin{cases} 0 \le t_i \le \alpha_1 & \text{(when the probability density function of } \varepsilon_i \text{ is } p = p_1 = N(\mu_1, \sigma_1^2)) \\ \alpha_1 \le t_i \le 1 & \text{(when the probability density function of } \varepsilon_i \text{ is } p = p_2 = N(\mu_2, \sigma_2^2)) \end{cases} \quad (13)$$

$$Q(\vec{\delta S_0}, \vec{\delta S}) = E[\log(p(\varepsilon, t | \vec{\delta S})) | \varepsilon, \vec{\delta S_0}] \quad (14)$$
$$= \int p(t | \varepsilon, \vec{\delta S_0}) \log(p(\varepsilon, t | \vec{\delta S})) dt$$
$$= \int \left( \frac{p(t, \varepsilon | \vec{\delta S_0})}{p(\varepsilon | \vec{\delta S_0})} \log(p(\varepsilon, t | \vec{\delta S})) \right) dt$$

In Expression (13), "$P_1$" is the first normal distribution model function included in the pseudorange residual GMM function, and "$P_2$" is the second normal distribution model function included in the pseudorange residual GMM function. In addition, "$\alpha_1$" is the weight of the first normal distribution model function. In addition, in Expression (14), "$\delta S_0$" indicates the initial value of the amount of state correction, and "$\delta S$" indicates the updated value of the amount of state correction.

Since the EM algorithm is well-known, detailed explanation regarding the transformation of equations and the like until the solution is derived will be omitted. Finally, the estimate of the amount of state correction "$\delta S$" is calculated as expressed by the following Expression (15).

$$\delta \vec{S} = \begin{bmatrix} \delta \vec{p} \\ \delta b \end{bmatrix} \quad (15)$$

$$= (G^T(M_1 + M_2)G)^{-1} G^T (M_1(\delta \vec{\rho} - \mu_1) + M_2(\delta \vec{\rho} - \mu_2))$$

Here, "$\mu_1$" and "$\mu_2$" are expected values of the first and second normal distribution model functions, respectively.

Moreover, in Expression (15), "$M_1$" and "$M_2$" are matrices set for the first and second normal distribution model functions, respectively. "$M_1$" and "$M_2$" are given by the following Expressions (16) and (17).

$$M_1 = \left( \frac{1}{(\sigma_1^{(k)})^2} \cdot \frac{\alpha_1^{(k)} \cdot p_1^{(k)}(\varepsilon^{(k)})}{p_1^{(k)}(\varepsilon^{(k)})} \cdot \delta_{k,l} \right)_{(k,l)} \quad (16)$$

$$M_2 = \left( \frac{1}{(\sigma_2^{(k)})^2} \cdot \frac{\alpha_2^{(k)} \cdot p_2^{(k)}(\varepsilon^{(k)})}{p_2^{(k)}(\varepsilon^{(k)})} \cdot \delta_{k,l} \right)_{(k,l)} \quad (17)$$

In Expressions (16) and (17), "$\sigma_1$" and "$\sigma_2$" are standard deviations of the first and second normal distribution model functions, respectively. In addition, "$\delta_{k,l}$" is Kronecker's delta and is given by the following Expression (18).

$$\delta_{k,l} = \begin{cases} 1 & (k = l) \\ 0 & (k \neq l) \end{cases} \quad (18)$$

Subscripts written in parentheses at the last of the matrices "$M_1$" and "$M_2$" correspond to the numbers of row and column. In addition, the number "k" corresponding to a row corresponds to the number (k=1, 2, ..., K) of a GPS satellite. Since the matrices "$M_1$" and "$M_2$" include the Kronecker's delta "$\delta_{k,l}$" the matrices "$M_1$" and "$M_2$" have values only for elements whose row and column numbers are equal, and the values of the other elements are set to "0". Therefore, "$M_1$" and "$M_2$" become diagonal matrices.

If the amount of state correction "δS" is calculated according to Expression (15), the actual position "p" can be calculated by adding the amount of position correction "δp" to the assumed position "$p_a$" according to Expression (3). In addition, according to Expression (4), the actual clock bias "b" can be calculated by adding the amount of clock bias correction "δb" to the assumed clock bias "$b_a$".

2. Experimental Results

Experimental results after performing a position calculation operation using the position calculating method of the present embodiment will be described. Experiments for measuring the accuracy of position calculation were conducted by repeatedly performing position calculation with the different number of samples of the pseudorange residual "$\epsilon$" using the method in the related art and the method of the present embodiment. The number of times of position calculation was set to "200".

Figure 9:
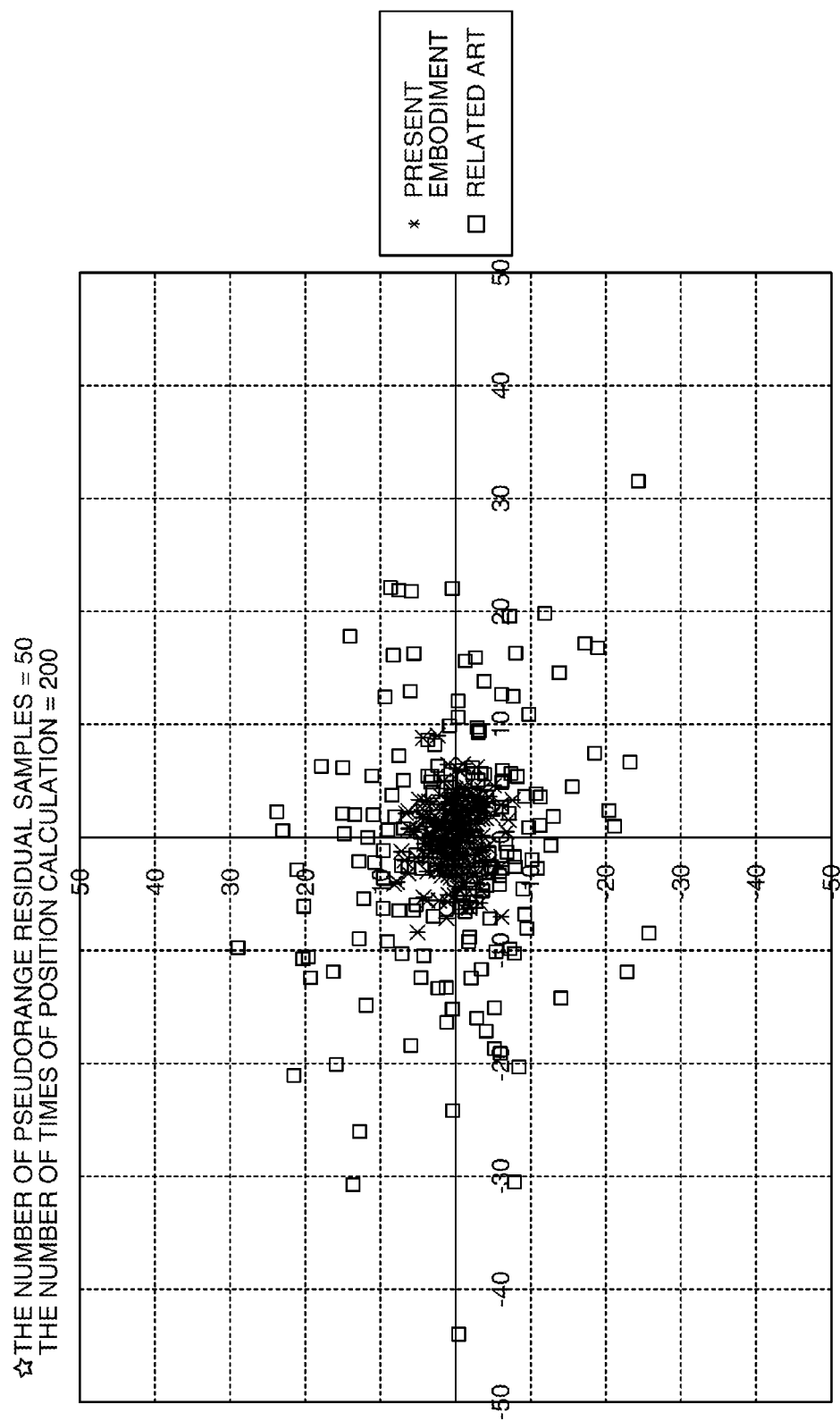
FIG. 9 is a view showing an example of an experimental result.

FIG. 9 is a graph showing an experimental result when the number of samples of the pseudorange residual "$\epsilon$" was set to 50 ($\epsilon = \epsilon^{(1)}, \epsilon^{(2)}, \ldots, \epsilon^{(50)}$). The horizontal direction of the graph indicates the position calculation accuracy in the east and west direction, and the vertical direction indicates the position calculation accuracy in the north and south direction. The center of the graph is equivalent to a position error "0".

This means that the position calculation accuracy becomes higher as the position becomes closer to the center of the graph. A rectangular plot indicates a position error when a position calculation operation is performed using the method in the related art, and an asterisked plot indicates a position error when a position calculation operation is performed using the method of the present embodiment. The number of plots is 200 corresponding to the number of times of position calculation.

From the graph shown in FIG. 9, it can be seen that the position calculation accuracy is low because plots are broadly scattered in the method in the related art. On the other hand, in the method of the present embodiment, most plots are distributed near the centre. Accordingly, it can be seen that the position calculation accuracy is improved compared with the method in the related art.

Figure 10:
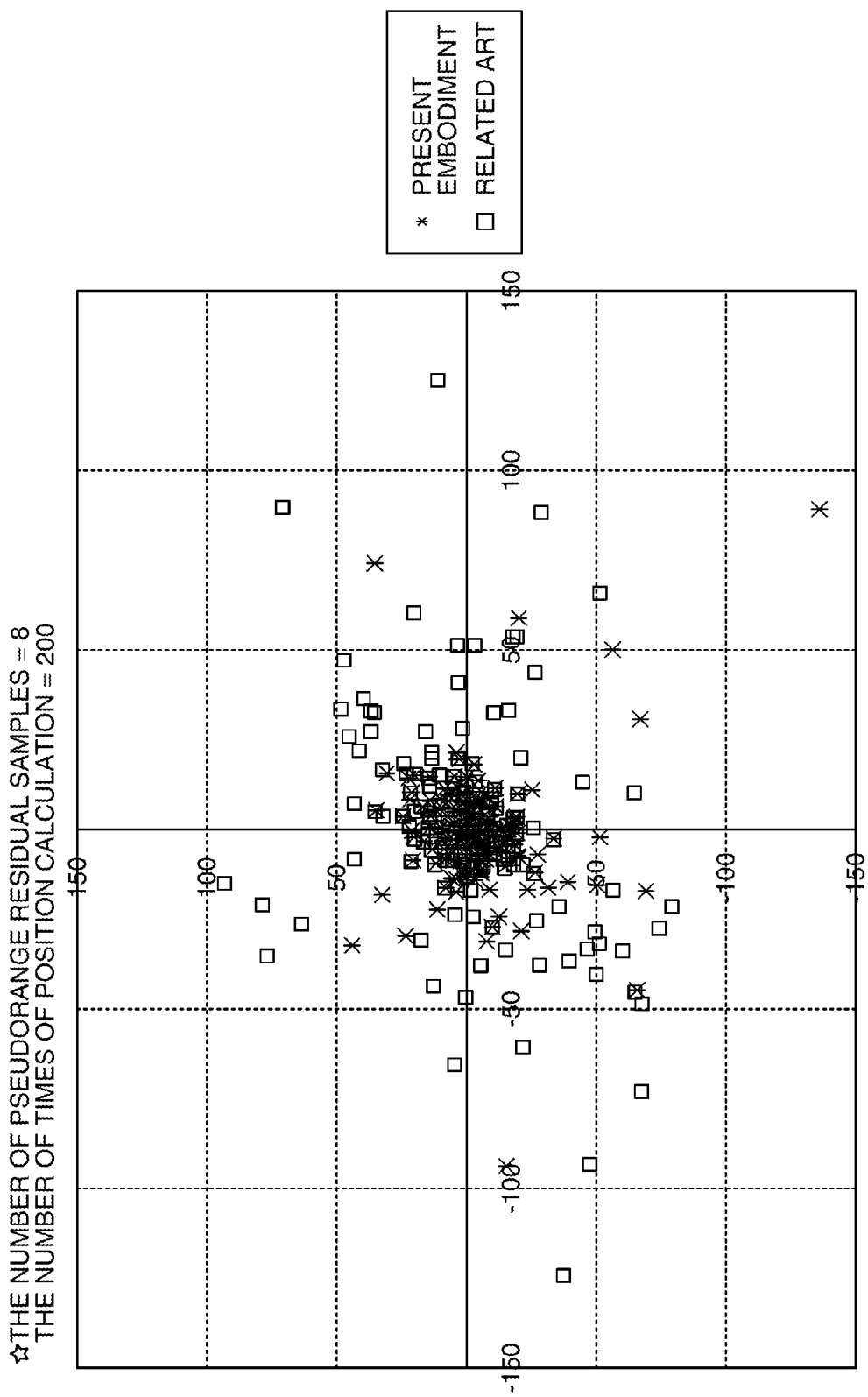
FIG. 10 is a view showing an example of an experimental result.

FIG. 10 is a graph showing an experimental result when the number of samples of the pseudorange residual "$\epsilon$" was set to 8 ($\epsilon = \epsilon^{(1)}, \epsilon^{(2)}, \ldots, \epsilon^{(8)}$). The way of viewing the graph is the same as FIG. 9, but the unit of one mass of the graph is different.

Also from the graph shown in FIG. 10, it can be seen that the position calculation accuracy is improved compared with the method in the related art because most plots are distributed near the centre in the method of the present embodiment. In addition, the experimental results shown in FIGS. 9 and 10 show that the position calculation accuracy is improved as the number of samples of the pseudorange residual "$\epsilon$" increases.

The reason why the position calculation accuracy is improved as described above will be considered. According to the results of the experiments performed by the inventor of this application, it could be seen that a large error exceeding 100 meters in each of the positive and negative directions might be mixed in the pseudorange in the multi-path environment. When such a large error is mixed in the pseudorange, a probability density (probability) corresponding to the error, which is calculated using a probability density function according to the normal distribution in the related art, becomes a value which is confined to nearly "0". In the position calculation operation, maximum likelihood estimation is performed such that a simultaneous occurrence probability of errors of the pseudorange for a plurality of captured satellites is maximized. Accordingly, if a satellite for which the probability density is extremely small is included, a possibility that the maximum likelihood estimation will fail due to the probability density of the satellite (or a possibility that an estimation result with extremely low accuracy will be obtained) is increased.

However, since the pseudorange residual GMM function defined in the present embodiment includes the second normal distribution model function with a wide error range as shown in FIG. 7, it becomes a probability density function with a wide base. For this reason, even if a large error of 100 meters is mixed into a pseudorange, a probability density corresponding to the error is a large value to some extent. In this case, since the possibility is low that the maximum likelihood estimation will fail due to the extremely small probability density, the maximum likelihood estimation can be appropriately performed. As a result, a very accurate position can be acquired by convergence calculation.

3. Examples

Next, an example when the invention is applied to a mobile phone, which is a type of electronic apparatus containing a position calculating device, will be described. In addition, it is needless to say that the examples, to which the invention can be applied, are not limited to the examples which will be described below.

3-1. Functional configuration

Figure 11:
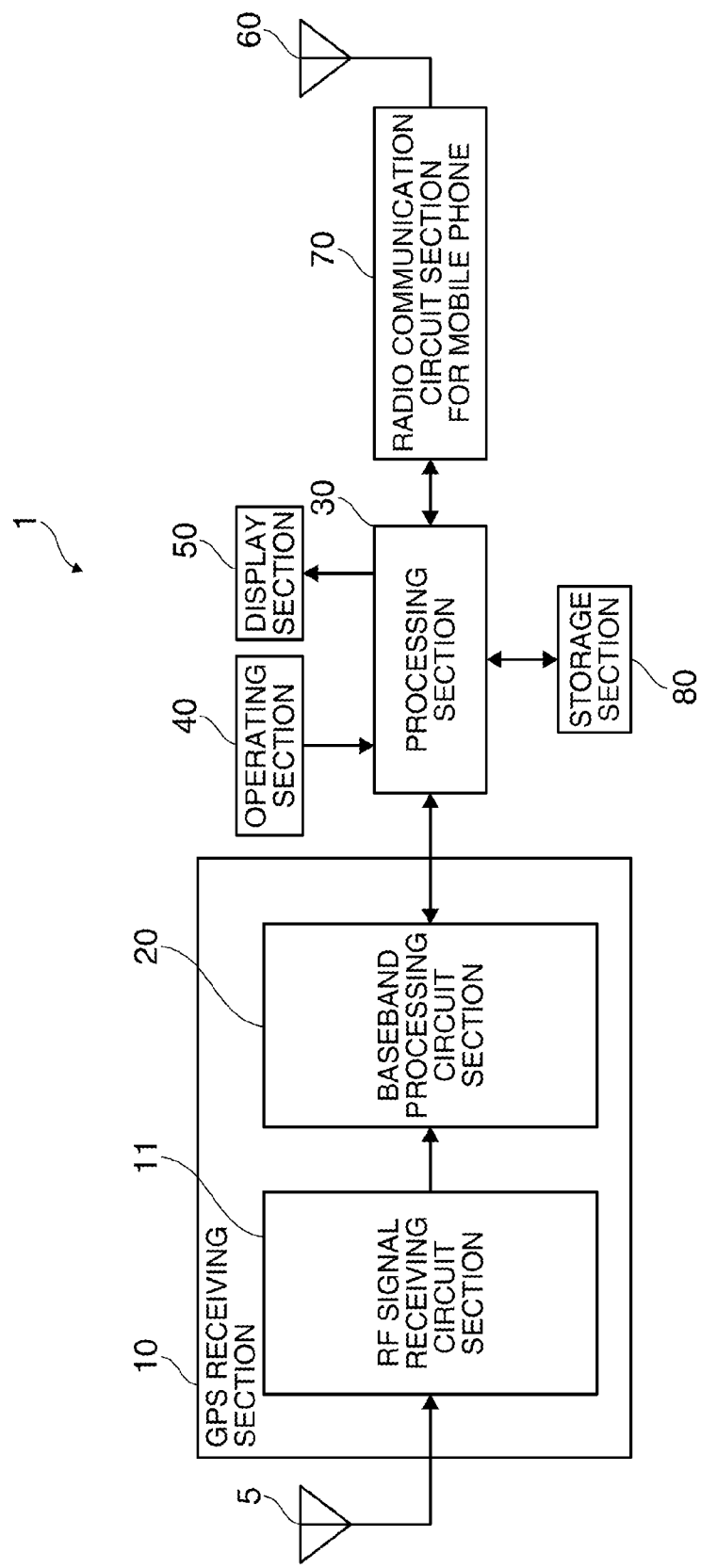
FIG. 11 is a block diagram showing an example of the functional configuration of a mobile phone.

FIG. 11 is a block diagram showing an example of the functional configuration of a mobile phone 1 in this example. The mobile phone 1 includes a GPS antenna 5, a GPS signal receiving section 10, a processing section 30, an operating section 40, a display section 50, a mobile phone antenna 60, a radio communication circuit section 70 for a mobile phone, and a storage section 80.

The GPS antenna 5 is an antenna that receives an RF (Radio Frequency) signal including a GPS satellite signal transmitted from a GPS satellite, and outputs the received signal to the GPS signal receiving section 10.

The GPS signal receiving section 10 is a position calculating circuit or a position calculating device which measures the position of the mobile phone 1 on the basis of a signal output from the GPS antenna 5, and is also a functional block equivalent to the GPS signal receiver. The GPS signal receiving section 10 includes an RF signal receiving circuit section 11 and a baseband processing circuit section 20. In addition, the RF signal receiving circuit section 11 and the baseband processing circuit section 20 may be manufactured as separate LSIs (large scale integration) or may be manufactured as one chip.

The RF signal receiving circuit section 11 is a circuit which receives an RF signal. As the circuit configuration, it is possible to adopt a configuration in which an A/D converter converts an RF signal output from the GPS antenna 5 into a digital signal and a signal receiving circuit processes the digital signal, for example. Alternatively, it is also possible to adopt a configuration in which the RF signal output from the GPS antenna 5 is subjected to signal processing in the state of an analog signal and A/D converted in a final stage and this digital signal is output to the baseband processing circuit section 20.

In the latter case, the RF signal receiving circuit section 11 may be configured as follows, for example. That is, the RF signal receiving circuit section 11 generates an oscillation signal for RF signal multiplication by dividing or multiplying a predetermined oscillation signal. Then, the RF signal is down-converted into a signal (hereinafter, referred to as an "IF (intermediate frequency) signal") with an intermediate frequency by multiplying the RF signal output from the GPS antenna 5 by the generated oscillation signal, and the IF signal is amplified, for example. Then, the IF signal is converted into a digital signal by an A/D converter and is then output to the baseband processing circuit section 20.

The baseband processing circuit section 20 is a processing circuit block that captures a GPS satellite signal by performing correlation processing and the like on the received signal, which is output from the RF signal receiving circuit section 11, and that calculates the position (position coordinates) of the mobile phone 1 by performing a predetermined position calculation operation on the basis of the satellite orbit data, time information, and the like extracted from the GPS satellite signal.

Figure 12:
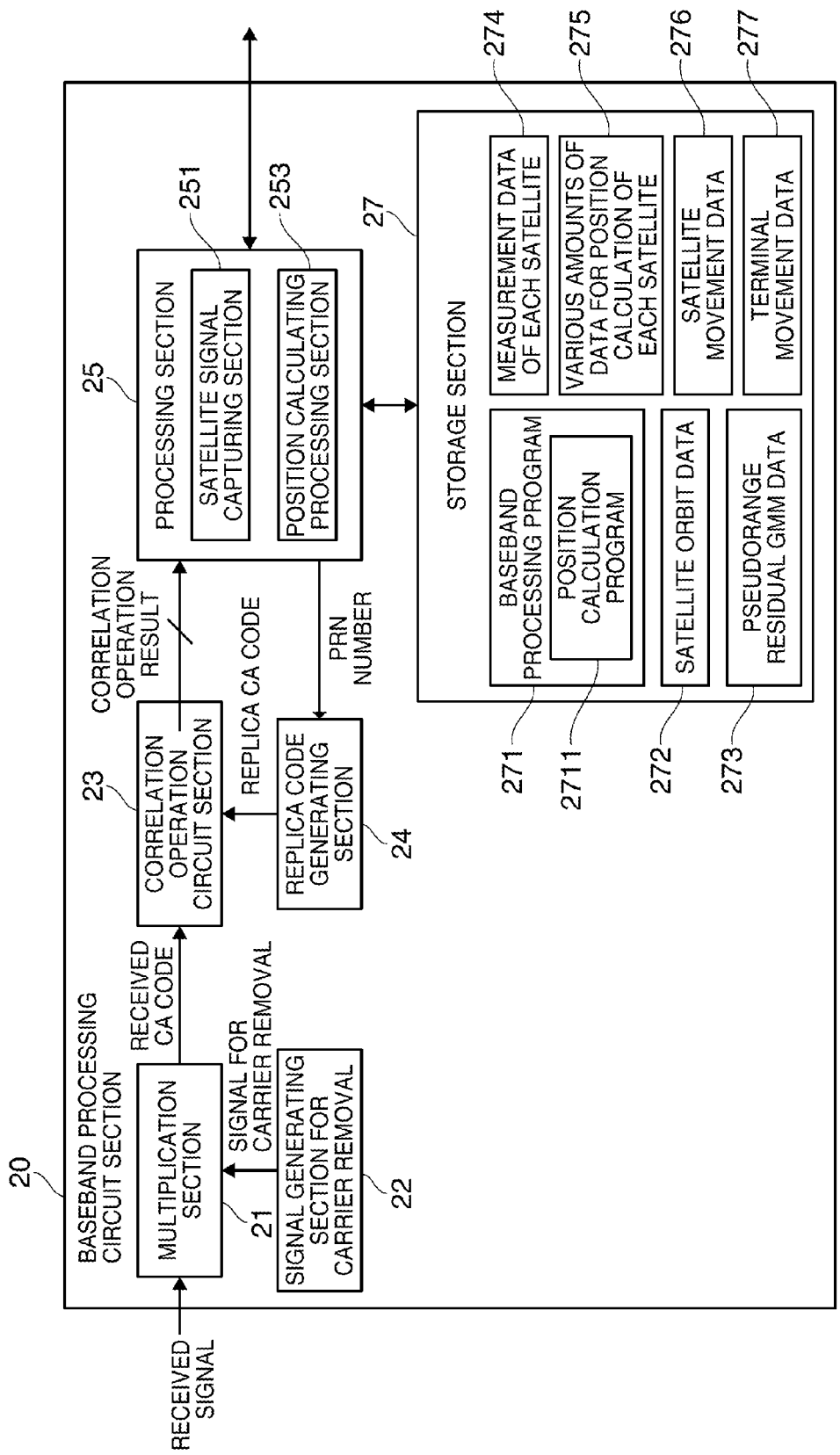
FIG. 12 is a view showing an example of the circuit configuration of a baseband processing circuit section.

FIG. 12 is a view showing an example of the circuit configuration of the baseband processing circuit section 20, and mainly shows a circuit block related to this example. The baseband processing circuit section 20 includes a multiplication section 21, a signal generating section 22 for carrier removal, a correlation operation circuit section 23, a replica code generating section 24, a processing section 25, and a storage section 27.

The multiplication section 21 is a circuit section which down-converts a received signal into a signal, from which a carrier has been removed, by multiplying the received signal by a signal for carrier removal generated by the signal generating section 22 for carrier removal. For example, the multiplication section 21 is configured to include a multiplier. From the multiplication section 21, a CA code (hereinafter, referred to as a "received CA code") obtained by removing a carrier component from the received signal is output to the correlation operation circuit section 23.

The signal generating section 22 for carrier removal is a circuit which generates a signal for carrier removal with the same frequency as a carrier signal of a GPS satellite signal. The signal generating section 22 for carrier removal is configured to include an oscillator, such as a carrier NCO (Numerical Controlled Oscillator). In addition, when the signal output from the RF signal receiving circuit section 11 is an IF signal, a signal for carrier removal of the IF frequency is generated. Thus, also when the RF signal receiving circuit section 11 down-converts a received signal into an IF signal, this example may be applied substantially identically.

The correlation operation circuit section 23 is a circuit section which performs a correlation operation of the received CA code output from the multiplication section 21 and the replica CA code generated by the replica code generating section 24 and outputs the correlation operation result to the processing section 25. The correlation operation circuit section 23 is configured to include a plurality of correlators and the like.

The correlation operation circuit section 23 performs a correlation operation of each IQ component of the received signal and the replica CA code input from the replica code generating section 24. In addition, although a circuit block which separates an IQ component of a received signal (IQ separation) is not shown, any circuit block may be applied. For example, the IQ separation may be performed by multiplying the received signal by a local oscillation signal with a phase, which is different by 90° from the phase of the received signal when the RF signal receiving circuit section 11 down-converts the received signal into an IF signal.

The replica code generating section 24 is a circuit section which generates a replica CA code obtained by simulating a CA code which is a spread code of a GPS satellite signal. The replica code generating section 24 is configured to include an oscillator, such as a code NCO. The replica code generating section 24 generates a replica CA code corresponding to a PRN number (satellite number) designated from the processing section 25 by adjusting the output phase (time) according to the designated phase and outputs it to the correlation operation circuit section 23.

The processing section 25 is a control device which performs overall control of each functional section of the baseband processing circuit section 20. The processing section 25 is configured to include a processor, such as a CPU (Central Processing Unit). The processing section 25 has a satellite signal capturing section 251 and a position calculating section 253 as main functional sections.

The satellite signal capturing section 251 performs correlation processing for integrating a correlation operation result, which is output from the correlation operation circuit section 23, for a correlation integration time. Then, the satellite signal capturing section 251 captures a GPS satellite signal on the basis of the correlation integration result obtained by the correlation processing.

The position calculating section 253 is a processing section which calculates the position of the mobile phone 1 by performing a position calculation operation using the GPS satellite signal captured by the satellite signal capturing section 251. The position calculating section 253 functions as a pseudorange calculating section which calculates a pseudorange using the GPS satellite signal captured by the satellite signal capturing section 251 and also functions as a position calculating section which calculates a position using pseudorange residual GMM data 273 stored in the storage section 27.

The position calculating device of the present embodiment is configured to include the position calculating section 253 which functions at least as a pseudorange calculating section and a position calculating section. In addition, the position calculating device may include other configurations of the baseband processing circuit section 20 shown in FIG. 12. In addition, the position calculating device may include other configurations of the mobile phone 1 shown in FIG. 11.

The storage section 27 is formed by using storage devices (memories), such as a ROM (Read Only Memory) or a flash ROM and a RAM (Random Access Memory), and stores a system program of the baseband processing circuit section 20, various programs or data used to realize various functions involving a satellite signal capture function, a position calculation function, and the like. In addition, the storage section 27 has a work area where the data being processed, a processing result, and the like in various kinds of processing are temporarily stored.

For example, as shown in FIG. 12, a baseband processing program 271 which is read by the processing section 25 and executed as baseband processing (refer to FIG. 15) is stored in the storage section 27 as a program. The baseband processing program 271 has a position calculation program 2711, which is executed as position calculation processing (refer to FIG. 16), as a subroutine.

In addition, satellite orbit data 272, pseudorange residual GMM data 273, measurement data of each satellite 274, various amounts of data for position calculation of each satellite 275, satellite movement data 276, and terminal movement data 277 are stored in the storage section 27.

In the baseband processing, the processing section 25 performs processing of capturing a GPS satellite signal by performing correlation processing for each GPS satellite to be captured (hereinafter, referred to as a "satellite to be captured") and calculating the position of the mobile phone 1 by performing position calculation processing using the captured GPS satellite signal.

In addition, the position calculation processing is processing when the position calculating section 253 calculates the position of the mobile phone 1 by performing a position calculation operation using the position calculating method described in the principle. Details of these processings will be described later using a flow chart.

The satellite orbit data 272 is data, such as an almanac in which the information regarding approximate satellite orbits of all GPS satellites is stored or an ephemeris in which the detailed satellite orbit information regarding each GPS satellite is stored. The satellite orbit data 272 may be acquired by demodulating a GPS satellite signal received from a GPS satellite or may be acquired as assistant data from a base station or an assistant server of the mobile phone 1, for example.

The pseudorange residual GMM data 273 is data in which a pseudorange residual normal mixture distribution model (pseudorange residual GMM), which is obtained by modeling a pseudorange residual "$\epsilon$" on the basis of the normal mixture distribution, is stored. As the data, a pseudorange residual GMM function "$p(\epsilon)$" having a pseudorange residual "$\epsilon$" as a probability variable may be stored or a pseudorange residual GMM table, in which the pseudorange residual "$\epsilon$" is matched to a "probability density $p(\epsilon)$" in a table format, may be stored. Even the data based on any type of format, it is still a normal mixture distribution model which expresses the distribution of an error included in a pseudorange with the normal mixture distribution.

Figure 13:
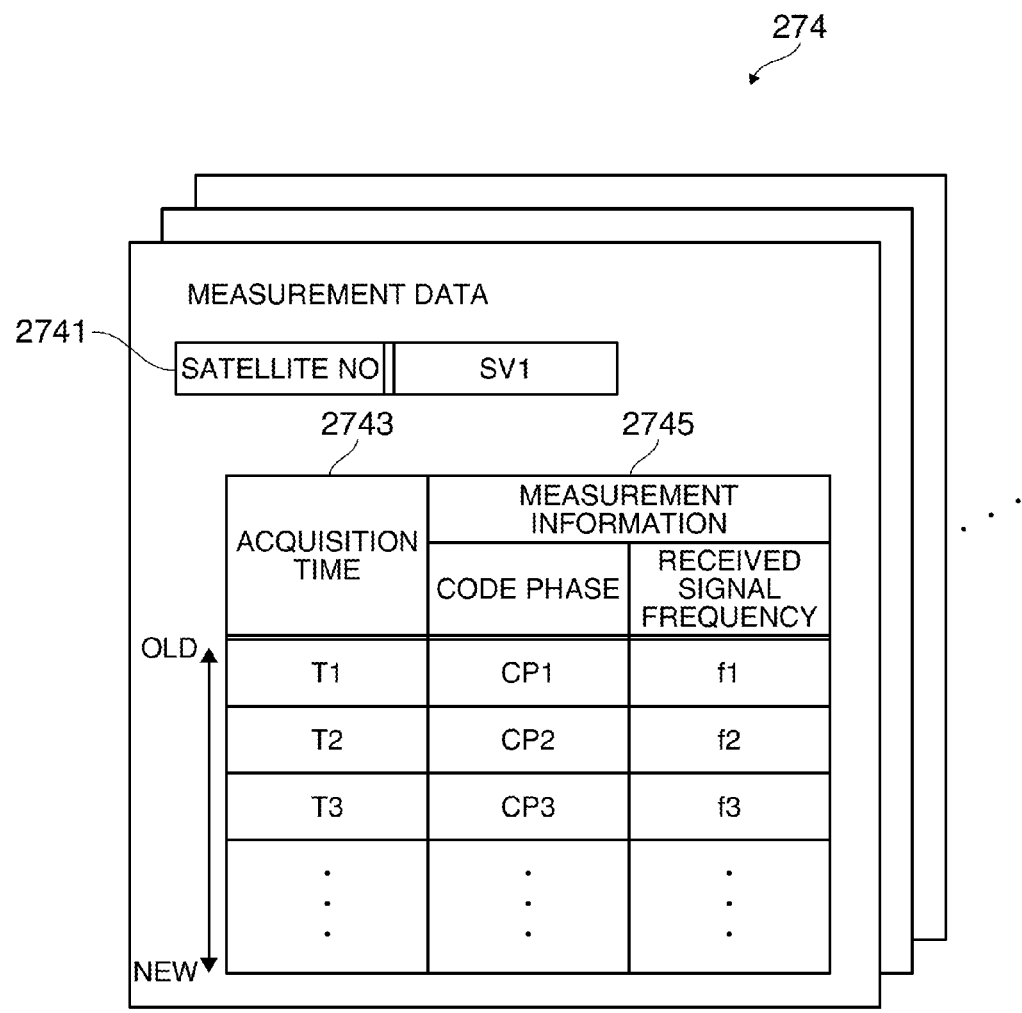
FIG. 13 is a view showing an example of the data configuration of measurement data for each satellite.

The measurement data of each satellite 274 is data in which the measurement information is stored for each GPS satellite. An example of the data configuration is shown in FIG. 13. In the measurement data of each satellite 274, measurement data including an acquisition time 2743 of measurement information and measurement information 2745 are stored so as to match the number 2741 of a captured GPS satellite.

The measurement information 2745 includes a code phase, which is the phase of a CA code received from a corresponding GPS satellite (received CA code), and a received frequency, which is a frequency when a GPS satellite signal is received from the GPS satellite. The code phase is used for calculation of the pseudorange and the like. In addition, the received frequency is used for frequency search, calculation of the traveling speed and the movement direction of a terminal, and the like.

Figure 14:
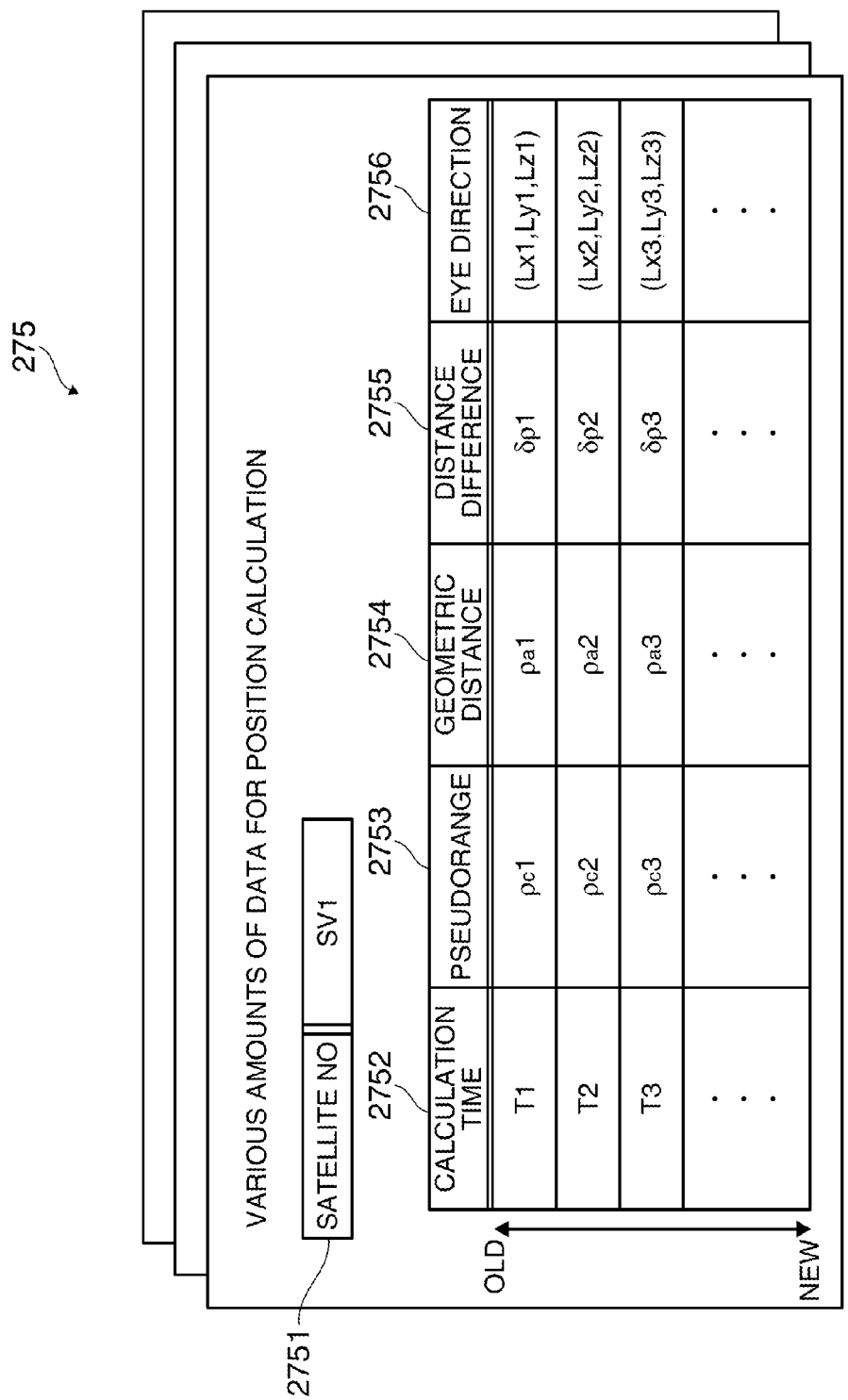
FIG. 14 is a view showing an example of the data configuration of various amounts of data for position calculation of each satellite.

The various amounts of data for position calculation of each satellite 275 is data in which various values used for the position calculation operation are stored for each GPS satellite. An example of the data configuration is shown in FIG. 14. In the various amounts of data for position calculation of each satellite 275, various amounts of data for position calculation including a calculation time 2752 of various amounts of data for position calculation, a pseudorange 2753, a geometric distance 2754, a distance difference 2755, and an eye direction 2756 is stored so as to match the number 2751 of a captured GPS satellite.

The satellite movement data 276 is data in which the satellite movement information indicating a movement state of a GPS satellite is stored. Specifically, the position, traveling speed, and movement direction of each GPS satellite are stored in time series, for example. The satellite movement information is calculated using the satellite orbit information stored in the satellite orbit data 272 and the time information counted by a timepiece section (not shown).

The terminal movement data 277 is data in which the terminal movement information indicating a movement state of the mobile phone 1 is stored. Specifically, the position, traveling speed, and movement direction of the mobile phone 1 are stored in time series, for example. The position of the mobile phone 1 is calculated by the position calculation operation described in principle. In addition, the traveling speed and the movement direction of the mobile phone 1 are calculated by a well-known speed calculation operation using a received frequency included in the measurement information, for example.

Returning to the functional block shown in FIG. 11, the processing section 30 is a processor which performs overall control of each section of the mobile phone 1 according to various programs, such as a system program, stored in the storage section 80, and functions as a host CPU. The processing section 30 performs processing for realizing original functions as a mobile phone, such as a call function or an email transmission and reception function, an Internet function, and a camera function. In addition, the processing section 30 performs processing for displaying a map, which indicates the current position, on the display section 50 on the basis of the position coordinates output from the baseband processing circuit section 20 or uses the position coordinates for various kinds of application processing.

The operating section 40 is an input device configured to include a touch panel or a button switch, for example, and outputs a signal corresponding to a pressed key or button to the processing section 30. Through the operation of the operating section 40, various instructions, such as a call request, a mail transmission or reception request, and a position calculation request, are input.

The display section 50 is a display device formed by using an LCD (Liquid Crystal Display), for example, and performs various kinds of display on the basis of a display signal input from the processing section 30. A position display screen, time information, and the like are displayed on the display section 50.

The mobile phone antenna 60 is an antenna used to perform transmission and reception of a radio signal for mobile phones between the mobile phone 1 and a base station installed by a communication service provider of the mobile phone 1.

The radio communication circuit section 70 for a mobile phone is a communication circuit section of a mobile phone configured to include an RF conversion circuit, a baseband processing circuit, and the like and realizes transmission and reception of a call or email by performing modulation, demodulation, and the like of the radio signal for mobile phones.

The storage section 80 is a storage device in which a system program used when the processing section 30 controls the mobile phone 1, various programs or data for executing various kinds of application processing, and the like are stored.

3-2. Flow of Processing

Figure 15:
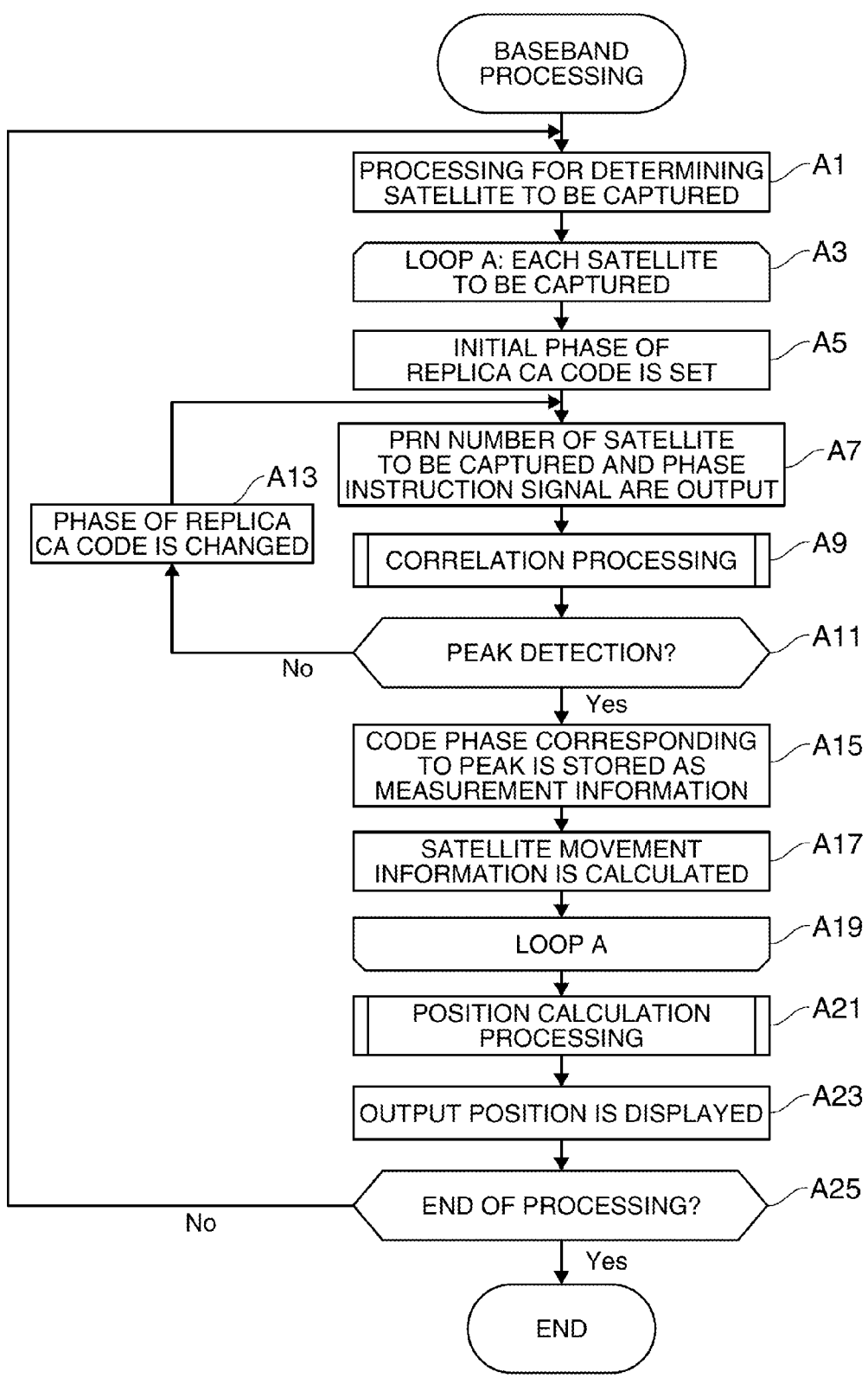
FIG. 15 is a flow chart showing the flow of baseband processing.

FIG. 15 is a flow chart showing the flow of baseband processing executed in the baseband processing circuit section 20 when the processing section 25 reads and executes the baseband processing program 271 stored in the storage section 27.

First, the satellite signal capturing section 251 performs captured satellite determination processing (step A1). Specifically, at a current time measured by a timepiece section (not shown), the satellite signal capturing section 251 determines a GPS satellite located in the sky of a predetermined reference position using the satellite orbit data 272, which is stored in the storage section 27, to determine a satellite to be captured. A position acquired by so-called server assistance of an assistant server or a last position calculated before power off can be set as the reference position, for example, in the case of first position calculation after supply of power. In addition, from the second position calculation, a newest calculation position or the like can be set as the reference position.

Then, the satellite signal capturing section 251 executes processing of a loop A for each satellite to be captured which was determined in step A1 (steps A3 to A19). In the processing of the loop A, the satellite signal capturing section 251 sets an initial phase which is an initial value of the code phase of a replica CA code (step A5). At the time of the first capture of a satellite to be captured, any phase can be set as an initial phase. Moreover, from the second capture, for example, a phase when the satellite to be captured was captured last can be set as the initial phase.

Then, the satellite signal capturing section 251 outputs the PRN number of the satellite to be captured and an instruction signal, which instructs the phase of the replica CA code, to the replica code generating section 24 (step A7).

Then, the satellite signal capturing section 251 performs correlation processing (step A9). Specifically, the satellite signal capturing section 251 performs processing for integrating the correlation operation result, which is output from the correlation operation circuit section 23, for a predetermined correlation integration time (for example, 20 milliseconds). The correlation operation result is integrated in order to prevent the peak of the correlation value, which is a correlation operation result, from being buried since a received signal is weak under a weak electric field environment or the like, so that the peak can be easily detected.

After performing correlation processing, the satellite signal capturing section 251 performs peak detection for a correlation integration result (step A11). If it is determined that a peak has not been detected (step A11; No), the satellite signal capturing section 251 changes the phase of a replica CA code (step A13) and returns to step A7. If it is determined that a peak has been detected (step A11; Yes), the satellite signal capturing section 251 stores the code phase corresponding to the detected peak, as the measurement information 2745, in the measurement data so as to match the acquisition time 2743 (step A15).

In addition, although illustration and detailed explanation are omitted, the satellite signal capturing section 251 also performs frequency search of a GPS satellite signal while changing a search frequency. Moreover, the satellite signal capturing section 251 sets a frequency when the search of a GPS satellite signal has succeeded as a received frequency and stores it in the measurement data as the measurement information 2745.

Then, the satellite signal capturing section 251 calculates the satellite movement information (step A17). Specifically, the satellite signal capturing section 251 calculates the satellite position, satellite speed, and satellite movement direction of the satellite to be captured at a time measured by a timepiece section (not shown) on the basis of the satellite orbit data 272 stored in the storage section 27 and stores them in the storage section 27 as the satellite movement data 276.

Then, the satellite signal capturing section 251 moves the processing to the next satellite to be captured. After performing the processing of steps A5 to A17 for all satellites to be captured, the satellite signal capturing section 251 ends the processing of the loop A (step A19). Then, the position calculating section 253 performs position calculation processing according to the position calculation program 2711 stored in the storage section 27 (step A21).

Figure 16:
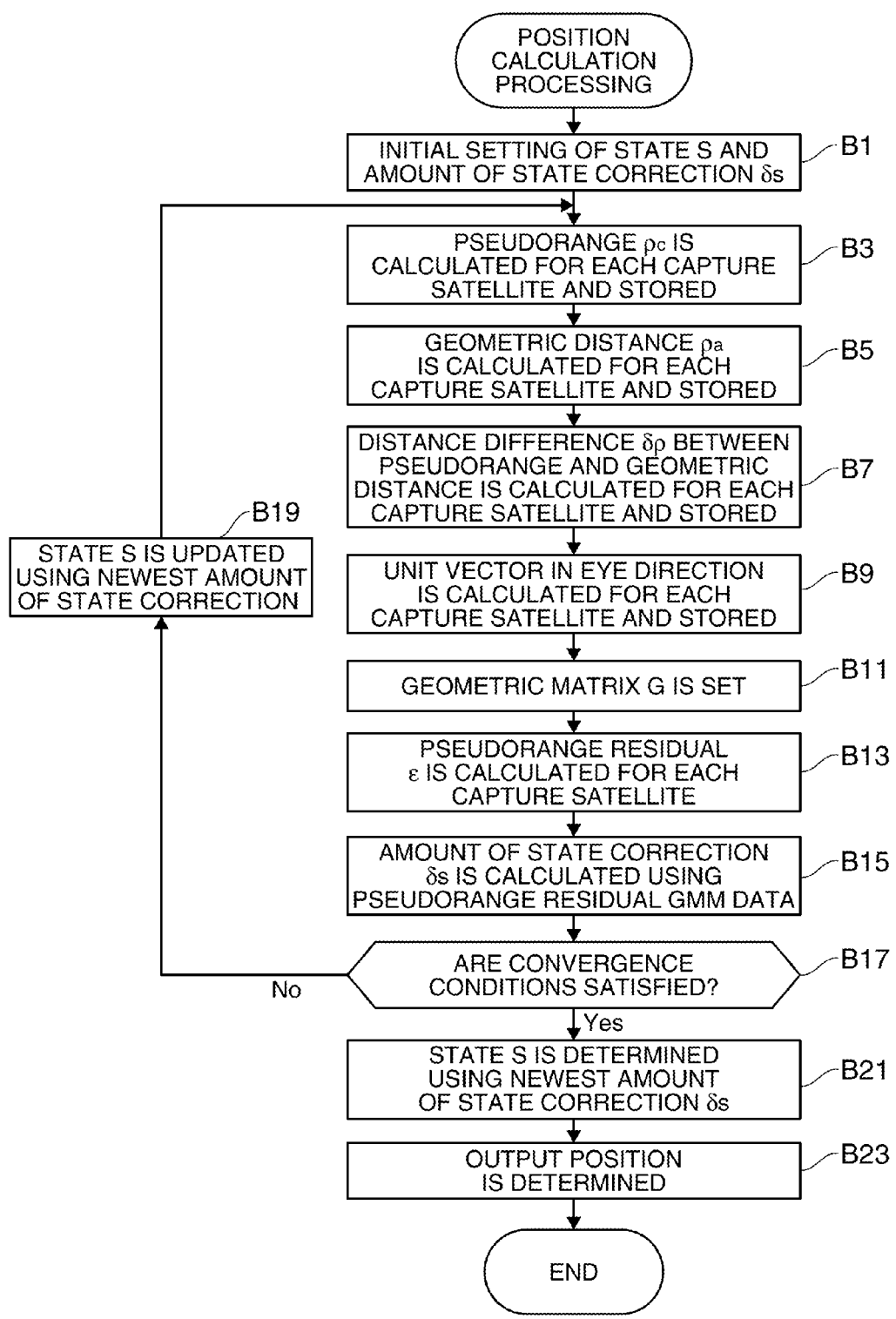
FIG. 16 is a flow chart showing the flow of position calculation processing.

FIG. 16 is a flow chart showing the flow of position calculation processing. First, the position calculating section 253 performs initial setting of a state "S=(p, b)" of the mobile phone 1 and the amount of state correction "$\delta S=(\delta p, \delta b)$" (step B1). For example, any value can be set as the initial value "$S_0=(p_0, b_0)$" in the case of first position calculation, and the value (newest value) calculated last can be set as the initial value "$S_0=(p_0, b_0)$" from second position calculation. This initialized state is an assumed state "$S_a=(p_a, b_a)$" and is updated by the following iteration when necessary. The amount of state correction "$\delta S$" is similarly initialized by setting a predetermined value, for example.

Then, the position calculating section 253 calculates a pseudorange "$\rho_c$" for each captured satellite and stores it in the various amounts of data for position calculation of each satellite 275 (step B3). The pseudorange "$\rho_c$" can be calculated using the code phase stored as the measurement information in the measurement data of each satellite 274.

Then, the position calculating section 253 calculates a geometric distance "$\rho_a$" for each captured satellite and stores it in the various amounts of data for position calculation of each satellite 275 (step B5). The geometric distance "$\rho_a$" is calculated as a distance between the newest satellite position "$P^{(k)}$", which is stored in the satellite movement data 276, and the assumed position "$P_a$" included in the newest assumed state "$S_a$" of the mobile phone 1.

Then, the position calculating section 253 calculates a distance difference "$\delta\rho$" between the pseudorange "$\rho_c$" calculated in step B3 and the geometric distance "$\rho_a$" calculated in step B5 for each captured satellite and stores it in the various amounts of data for position calculation of each satellite 275 (step B7).

Then, the position calculating section 253 calculates a unit vector "L" in the eye direction for each captured satellite and stores it in the various amounts of data for position calculation of each satellite 275 (step B9). The unit vector "L" in the eye direction can be calculated as a vector which has a direction from the newest assumed position "$P_a$" of the mobile phone 1 to the satellite position "$P^{(k)}$" and a size (norm) of "1".

Then, the position calculating section 253 sets a geometric matrix "G" of Expression (8) using the unit vector "L" in the eye direction calculated in step B9 (step B11). Then, for each captured satellite, the position calculating section 253 calculates the pseudorange residual "$\epsilon$" according to Expression (6) using the various values calculated in steps B5 to B11 (step B13).

Then, the position calculating section 253 calculates the amount of state correction "$\delta S$" according to Expression (15) using the pseudorange residual GMM data 273 of the storage section 27 (step B15). That is, the amount of state correction "$\delta S$" is newly calculated by calculation for which the EM algorithm is applied.

Then, the position calculating section 253 determines whether or not the conditions of convergence are satisfied (step B17). Specifically, the position calculating section 253 calculates a difference between the amount of state correction "$\delta S$" newly calculated and the amount of state correction "$\delta S$", calculated last. The difference is expressed as a norm of the difference between vectors of the amounts of state correction "$\delta S$". In addition, when the calculated difference is less than a predetermined threshold value, it is determined that the conditions of convergence are satisfied.

If it is determined that the conditions of convergence are not satisfied (step B17; No), the position calculating section 253 updates the state "S" using the newest amount of state correction "$\delta S$" (step B19). Then, the process returns to step B3. In addition, if it is determined that the conditions of convergence are satisfied (step B17; Yes), the position calculating section 253 determines the state "S" using the newest amount of state correction "$\delta S$" (step B21).

Then, the position calculating section 253 determines the output position, which is displayed on the display section 50 and output therefrom, on the basis of the state "S" determined in step B21 (step B23). Specifically, the position "p" included in the state "S" may be determined as an output position as it is, or the output position may be determined by performing well-known filtering (for example, PV (Position Velocity) filtering) using the past output position. Then, the position calculating section 253 ends the position calculation processing.

Returning to the baseband processing shown in FIG. 15, the processing section 30 displays on the display section 50 the output position determined by the position calculation processing (step A23). Then, the processing section 30 determines whether to end the processing (step A25). If it is determined that the processing is not ended yet (step A25; No), the process returns to step A1. Moreover, if it is determined that the processing should end (step A25; Yes), the processing section 30 ends the baseband processing.

4. Operations and Effects

According to the present embodiment, a pseudorange is calculated by receiving a GPS satellite signal from a GPS satellite. In addition, the position of a position calculating device (user) is calculated by performing a position calculation operation based on a maximum likelihood estimation method using the pseudorange normal mixture distribution model which expresses the distribution of an error (residual) included in the pseudorange with the normal mixture distribution.

Specifically, the code phase of a received CA code is detected by correlation processing on the CA code, which is a spread code of a GPS satellite signal, and a replica CA code generated inside the device, and the pseudorange is calculated using the code phase. In addition, the geometric distance between a position calculating device and a GPS satellite is calculated using the position (assumed position) of the position calculating device assumed and the satellite position of the GPS satellite, and the eye direction from the assumed position to the satellite position is calculated. In addition, a pseudorange residual is calculated using these various values, and a probability (probability density) corresponding to the pseudorange residual is calculated. After calculating a probability for each captured GPS satellite, the position of the position calculating device is calculated by updating the assumed position by iteration based on the maximum likelihood estimation method.

The pseudorange residual normal mixture distribution model is defined as a probability density function having the pseudorange residual "$\epsilon$" as a variable, for example. More specifically, the pseudorange residual normal mixture distribution model is defined as a probability density function in which a first normal distribution function "$P_1(\epsilon)$" when a normal signal reception environment of a position calculating device is assumed and a second normal distribution function "$P_2(\epsilon)$" when a multi-path environment is assumed are mixed. By using this pseudorange residual normal mixture distribution model, it is possible to calculate the position accurately in the normal signal reception environment and also to calculate the position accurately in the multi-path environment.

5. Modifications

5-1. Types of a Pseudorange Residual GMM Function

In the embodiment described above, the pseudorange residual "$\epsilon$" is modeled in a state where the behavior of the pseudorange residual "$\epsilon$" in the multi-path environment is assumed, as described in detail in the principle. The model function described in the above embodiment is an example of the modeling. Undoubtedly, in the pseudorange residual GMM function described in FIG. 7, the expected value or standard deviation of a pseudorange residual may be slightly shifted or the mixing ratio (weight of a model function) of the first and second normal distribution model functions may be appropriately adjusted.

In addition, even if it is simply called a multi-path environment, there are many signal reception conditions for GPS satellite signals. Accordingly, it is also possible to define a pseudorange residual GMM function different from the pseudorange residual GMM function shown in FIG. 7.

Figure 17:
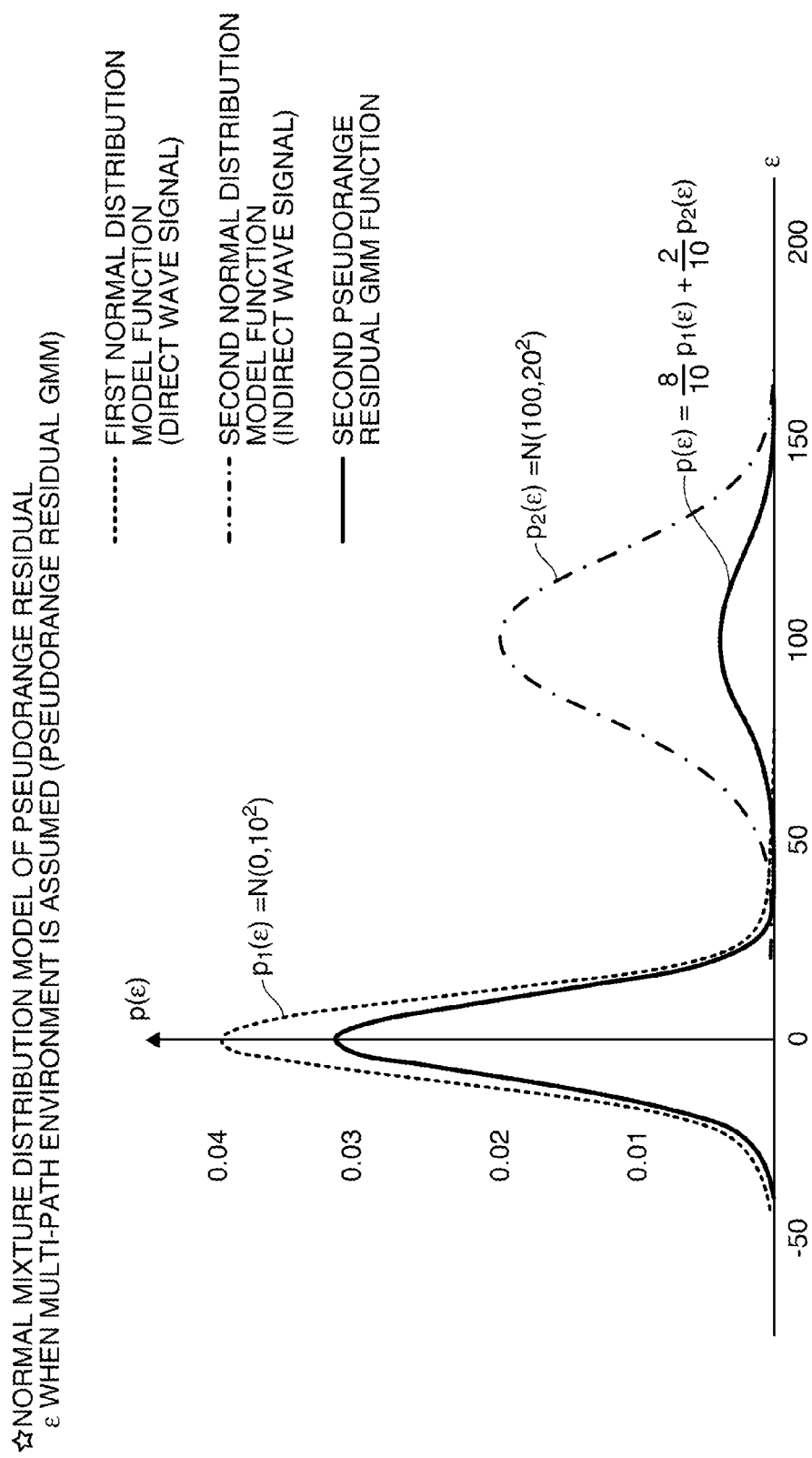
FIG. 17 is a view showing a second pseudorange residual GMM function.

FIG. 17 is a view showing a second pseudorange residual GMM function which is an example of another pseudorange residual GMM function. Similar to the pseudorange residual GMM function shown in FIG. 7, the second pseudorange residual GMM function is defined as a probability density function "p($\epsilon$)" obtained by mixing the first normal distribution model function "$P_1(\epsilon)$" and the second normal distribution model function "$P_2(\epsilon)$".

The first normal distribution model function "$P_1(\epsilon)$" is a model function of the pseudorange residual "$\epsilon$" when it is assumed that the position calculating device receives a direct wave signal, and is expressed as a normal distribution function N (0, $10^2$). On the other hand, the second normal distribution model function "$P_2(\epsilon)$" is a model function of the pseudorange residual "$\epsilon$" when it is assumed that the position calculating device receives an indirect wave signal in the multi-path environment or the like.

Figure 18:
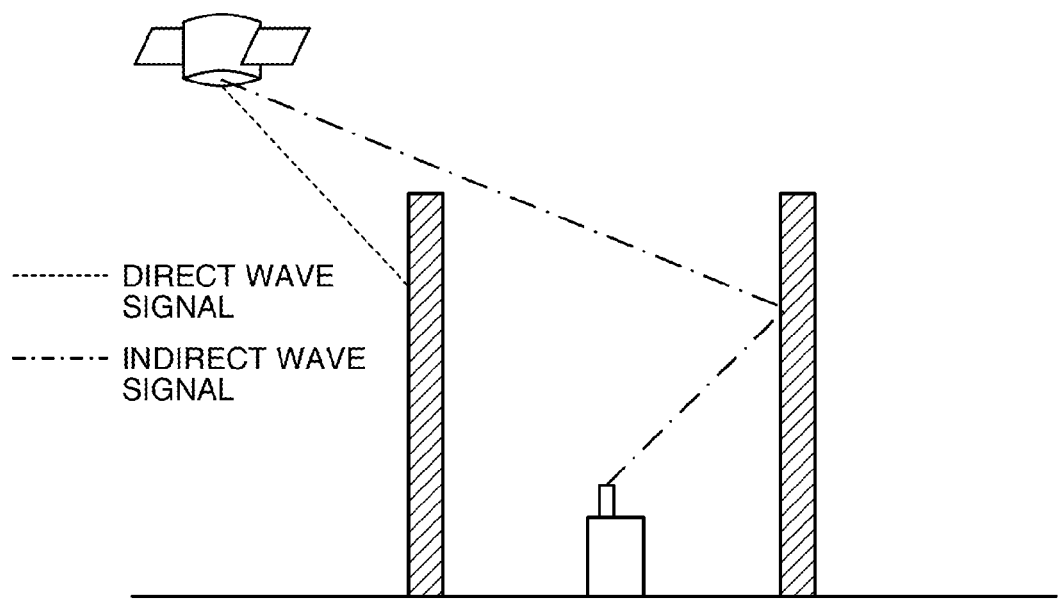
FIG. 18 is an explanatory view of a multi-path in a modification.

The second pseudorange residual GMM function is largely different from the pseudorange residual GMM function shown in FIG. 7 in that the second normal distribution model function "$P_2(\epsilon)$" is not a model function when receiving a direct wave signal and an indirect wave signal is assumed but a model function when receiving only an indirect wave signal is assumed. This may happen in an environment where there is an obstacle, such as a skyscraper, near the position calculating device as shown in FIG. 18, for example. Since the sky above the position calculating device is not completely open, a signal transmitted from a GPS satellite is reflected from the obstacle and reaches the position calculating device as an indirect wave signal. However, since the signal transmitted from the GPS satellite is blocked by the obstacle, a direct wave signal does not reach the position calculating device. A typical example thereof is an "urban canyon environment".

The results of the experiments performed by the inventor of this application show that a positive error of about +100 to +150 meters tends to be included as the pseudorange residual "$\epsilon$" in the urban canyon environment. Accordingly, in the second pseudorange residual GMM function shown in FIG. 17, the expected value "$\mu$" of the second normal distribution model function "$P_2(\epsilon)$" is set to "100 m" ($\mu$=100) and the standard deviation "$\sigma$" is set to "20 m" ($\sigma$=20). That is, "$P_2(\epsilon)=N(100, 20^2)$" is set.

The mixture ratio of the first and second normal distribution model functions is determined assuming that the position calculating device is influenced by multi-path with a probability of 20 percent. That is, the weight of the first normal distribution model function "$P_1(\epsilon)$" is set to "8/10 (80 percent)", and the weight of the second normal distribution model function "$P_2(\epsilon)$" is set to "2/10 (20 percent)". Therefore, the second pseudorange residual GMM function "p($\epsilon$)" is defined as a probability density function obtained by mixing a function, which is obtained by multiplying the first normal distribution model function "$P_1(\epsilon)$" by 8/10, and a function, which is obtained by multiplying the second normal distribution model function "$P_2(\epsilon)$" by 2/10.

Figure 19:
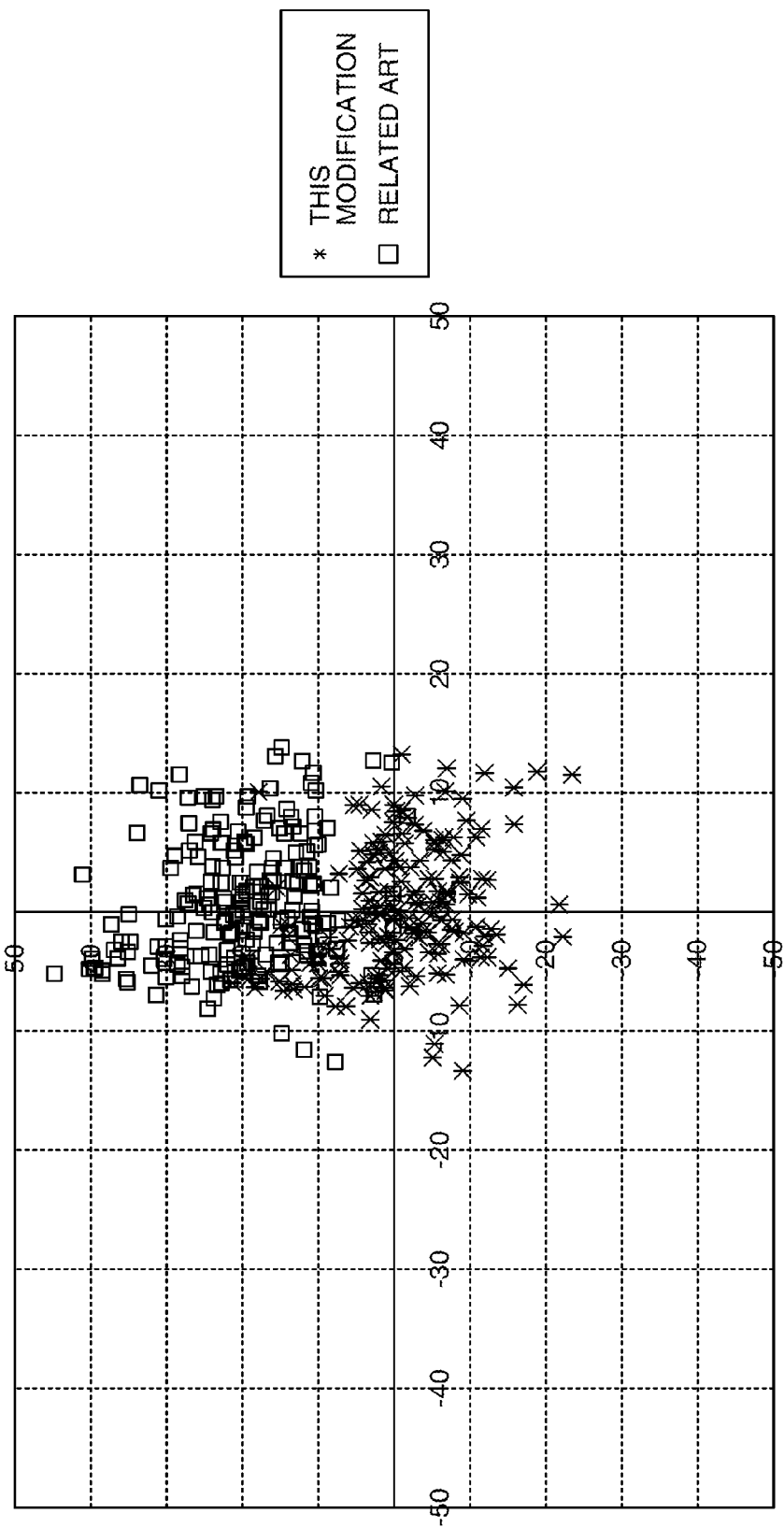
FIG. 19 is a view showing an example of an experimental result in the modification.

FIG. 19 is a view showing an example of an experimental result after performing a position calculation operation using the second pseudorange residual GMM function shown in FIG. 17. For each method in the related art and this modification, experiments of repeatedly performing position calculation were performed with eight samples ($\epsilon=\epsilon^{(1)}, \epsilon^{(2)}, \ldots, \epsilon^{(8)}$) of the pseudorange residual "$\epsilon$". The number of times of position calculation experiments is 200, and the way of viewing the graph is the same as FIGS. 9 and 10. From this graph, it can be seen that the position calculation accuracy is low in the method of the related art because most plots are distributed above the horizontal axis. On the other hand, in the method of this modification, it can be seen that the position calculation accuracy is improved because most plots are distributed near the centre.

5-2. Setting and Changing of the Pseudorange Residual GMM Function

The position calculation processing may be performed by setting and changing the pseudorange residual GMM function on the basis of the reception environment of a GPS satellite signal or the conditions, such as the signal strength of a GPS satellite signal, and this may also be applied to the modification of the pseudorange residual GMM function described above.

Figure 20:
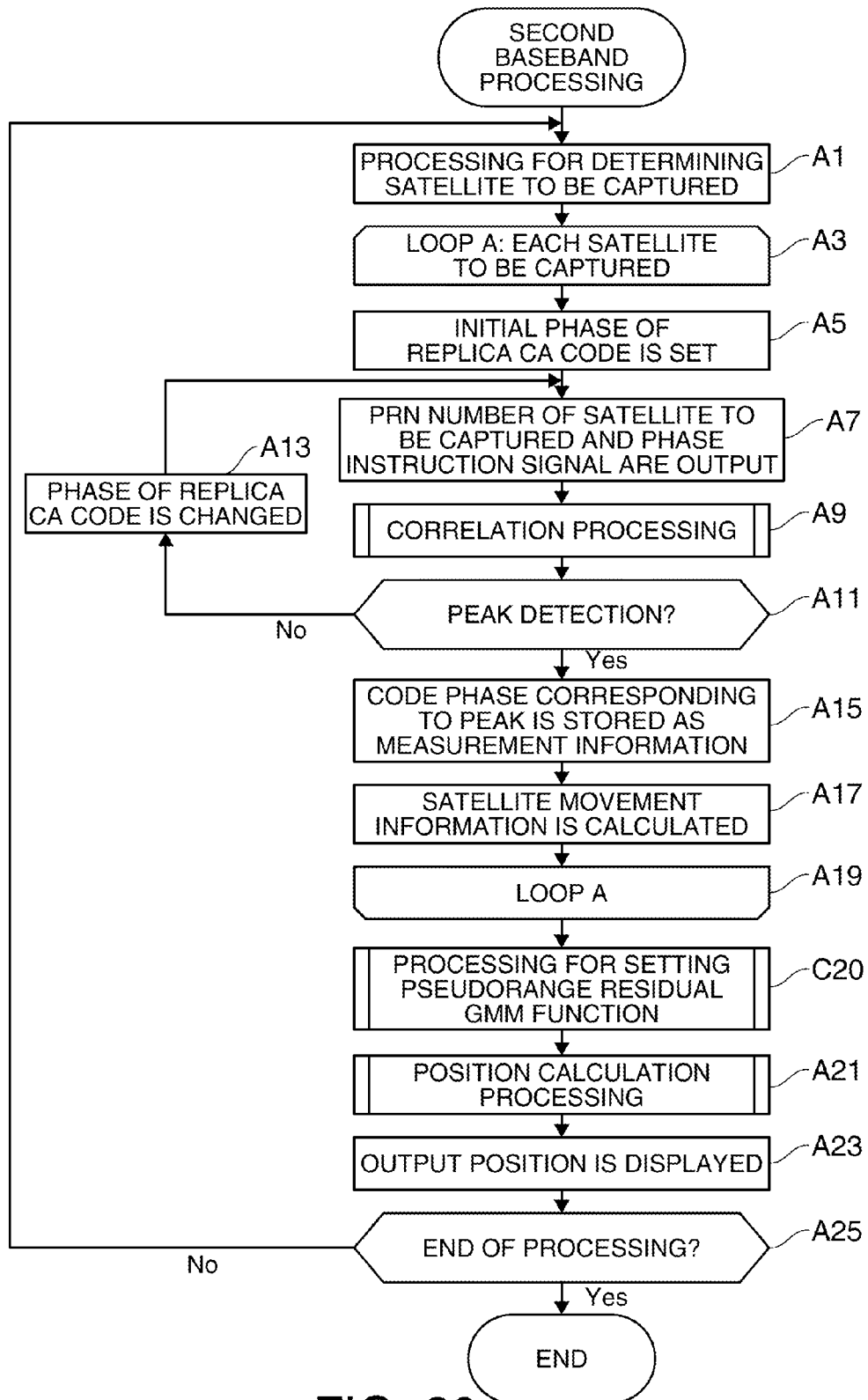
FIG. 20 is a flow chart showing the flow of second baseband processing.

FIG. 20 is a flow chart showing the flow of second baseband processing executed by the processing section 25 of the baseband processing circuit section 20 in that case. In addition, the same steps as in the baseband processing shown in FIG. 15 are denoted by the same reference numerals and explanation thereof is omitted, and only different steps from those in the baseband processing will be described.

In the second baseband processing, the processing section 25 performs pseudorange residual GMM function setting processing (step C20) after performing the processing of the loop A (step A19). Specifically, the processing section 25 sets a pseudorange residual GMM function, which is used in the position calculation processing, according to the reception environment of a GPS satellite signal or the like.

More specifically, for example, when the reception environment of a GPS satellite signal is an outdoor environment, the processing section 25 sets the first normal distribution model function "$P_1(\epsilon)$", which is indicated by a dotted line in FIG. 7, as a pseudorange residual GMM function. In addition, when the reception environment of a GPS satellite signal is a multi-path environment or an indoor environment, the processing section 25 sets the pseudorange residual GMM function indicated by a solid line in FIG. 7, for example. In addition, when the reception environment of a GPS satellite signal is an urban canyon environment, the processing section 25 sets the second pseudorange residual GMM function indicated by a solid line in FIG. 17, for example.

In addition, the conditions for setting a pseudorange residual GMM function are not necessarily limited to the reception environment of a GPS satellite signal. For example, the conditions for setting a pseudorange residual GMM function may be set on the basis of the information involving the signal strength of a received GPS satellite signal or the angle of elevation of a captured satellite. Specifically, the processing section 25 may set the second pseudorange residual GMM function shown in FIG. 17 when the signal strength of a received signal of GPS satellite signals is lower than a predetermined threshold strength (when predetermined low-strength conditions are satisfied) and set the pseudorange residual GMM function when the signal strength of a received signal of GPS satellite signals is larger than the threshold strength (when predetermined low-strength conditions are not satisfied).

5-3. Maximum Likelihood Estimation Algorithm

In the above-described embodiment, the case where the EM algorithm is applied as an algorithm for maximum likelihood estimation has been mentioned as an example. However, it is needless to say that other algorithms may be applied. For example, a gradient method, which is known as a mountain climbing method, may be applied. The gradient method is a type of algorithm for solving the optimization problem and is a method of performing parameter optimization using the gradient of a predetermined evaluation function. Specifically, it is preferable to search for a solution which maximizes the likelihood (logarithmic likelihood), in the same manner as in the above-described embodiment, using the gradient of a pseudorange residual GMM function.

5-4. Electronic Apparatus

In the above example, a mobile phone has been mentioned as an example of an electronic apparatus including the position calculating device. However, the electronic apparatus to which the invention can be applied is not limited to this. For example, the invention may be similarly applied to other electronic apparatuses, such as a car navigation apparatus, a portable navigation apparatus, a personal computer, a PDA (Personal Digital Assistant), and a wristwatch.

5-5. Satellite Positioning System

In addition, the explanation has been made using the GPS as an example of the satellite positioning system. However, other satellite positioning systems, such as a WAAS (wide area augmentation system), a QZSS (quasi zenith satellite system), a GLONASS (global navigation satellite system), and a GALILEO, may also be used.

5-6. Primary Component of Processing

Although the processing section 25 provided in the baseband processing circuit section 20 performs the position calculation processing in the examples described above, the processing section 30 which is a processor of an electronic apparatus may perform the position calculation processing. For example, the processing section 25 of the baseband processing circuit section 20 may capture a GPS satellite signal and acquire the measurement information. In addition, the processing section 30 may also perform the position calculation operation according to the above-described principle using the measurement information acquired by the processing section 25.

The entire disclosure of Japanese Patent Application No. 2010-121531, filed on May 27, 2010 is expressly incorporated by reference herein.

What is claimed is:

1. A position calculating method comprising:
    calculating a pseudorange by receiving a satellite signal from a positioning satellite; and
    calculating a position using a normal mixture distribution model which expresses distribution of an error included in the pseudorange with normal mixture distribution,
    wherein the normal mixture distribution model is defined as a probability density function having the error as a variable, and
    wherein the calculating of the position is to repeat calculating an error included in the pseudorange using an assumed position of the position, calculating a probability corresponding to the error using the normal mixture distribution model, and updating the assumed position using the probability.

2. The position calculating method according to claim 1, wherein the normal mixture distribution model is a model obtained by mixing at least a first normal distribution model and a second normal distribution model with a smaller peak value than that of the first normal distribution model.

3. The position calculating method according to claim 1, wherein the normal mixture distribution model is a model obtained by mixing at least a first normal distribution model and a second normal distribution model with a larger standard deviation than that of the first normal distribution model.

4. The position calculating method according to claim 1, wherein the normal mixture distribution model is a model obtained by mixing at least a first normal distribution model and a second normal distribution model with a larger expected value of an error than that of the first normal distribution model.

5. The position calculating method according to claim 1, wherein the normal mixture distribution model is a model obtained by mixing at least a first normal distribution model, which indicates distribution of an error included in the pseudorange when a direct wave of the satellite signal is received, and a second normal distribution model, which indicates distribution of an error included in the pseudorange when an indirect wave of the satellite signal is received.

6. A position calculating device comprising:
    a pseudorange calculating section which calculates a pseudorange by receiving a satellite signal from a positioning satellite; and
    a position calculating section which calculates a position using a normal mixture distribution model which expresses distribution of an error included in the pseudorange with normal mixture distribution,
    wherein the normal mixture distribution model is defined as a probability density function having the error as a variable, and
    wherein the position calculating section calculates the position by repeating calculating an error included in the pseudorange using an assumed position of the position, calculating a probability corresponding to the error using the normal mixture distribution model, and updating the assumed position using the probability.

* * * * *